United States Patent
Morita et al.

(10) Patent No.: US 9,063,794 B2
(45) Date of Patent: Jun. 23, 2015

(54) MULTI-THREADED PROCESSOR CONTEXT SWITCHING WITH MULTI-LEVEL CACHE

(71) Applicant: Panasonic Corporation, Osaka (JP)

(72) Inventors: Teruyuki Morita, Kyoto (JP); Yoshihiro Koga, Osaka (JP); Kouji Nakajima, Kyoto (JP)

(73) Assignee: SOCIONEXT INC., Kanagawa (JP)

( * ) Notice: Subject to any disclaimer, the term of this patent is extended or adjusted under 35 U.S.C. 154(b) by 139 days.

(21) Appl. No.: 13/645,127

(22) Filed: Oct. 4, 2012

(65) Prior Publication Data

US 2013/0031310 A1    Jan. 31, 2013

Related U.S. Application Data

(63) Continuation of application No. PCT/JP2011/000015, filed on Jan. 6, 2011.

(30) Foreign Application Priority Data

May 14, 2010    (JP) .................................. 2010-112657

(51) Int. Cl.
| | |
|---|---|
| G06F 12/00 | (2006.01) |
| G06F 9/50 | (2006.01) |
| G06F 9/455 | (2006.01) |
| G06F 9/46 | (2006.01) |

(Continued)

(52) U.S. Cl.
CPC .......... *G06F 9/5077* (2013.01); *G06F 9/45533* (2013.01); *G06F 9/461* (2013.01); *G06F 9/544* (2013.01); *G06F 12/0811* (2013.01); *G06F 12/084* (2013.01)

(58) Field of Classification Search
CPC ...................................................... G06F 12/084
See application file for complete search history.

(56) References Cited

U.S. PATENT DOCUMENTS 6,507,892 B1 *   1/2003   Mulla et al. .................... 711/131
6,877,067 B2    4/2005   Yamazaki (Continued)

FOREIGN PATENT DOCUMENTS

| CN | 1629800 A | 6/2005 |
|---|---|---|
| JP | 2001-236221 A | 8/2001 |

(Continued)

OTHER PUBLICATIONS

International Search Report mailed Mar. 1, 2011 issued in corresponding International Application No. PCT/JP2011/000015.

(Continued)

*Primary Examiner* — Gurtej Bansal
(74) *Attorney, Agent, or Firm* — McDermott Will & Emery LLP

(57) ABSTRACT

A computer system includes: a main storage unit, a processing executing unit sequentially executing processing to be executed on virtual processors; a level-1 cache memory shared among the virtual processors; a level-2 cache memory including storage areas partitioned based on the number of the virtual processors, the storage areas each (i) corresponding to one of the virtual processors and (ii) holding the data to be used by the corresponding one of the virtual processors; a context memory holding a context item corresponding to the virtual processor; a virtual processor control unit saving and restoring a context item of one of the virtual processors; a level-1 cache control unit; and a level-2 cache control unit.

10 Claims, 12 Drawing Sheets

(51) Int. Cl.
*G06F 9/54* (2006.01)
*G06F 12/08* (2006.01)

(56) References Cited

U.S. PATENT DOCUMENTS

| | | | |
|---|---|---|---|
| 7,386,707 B2 | 6/2008 | Kurata et al. | |
| 7,437,519 B2 | 10/2008 | Kiyota et al. | |
| 7,493,621 B2 | 2/2009 | Bradford et al. | |
| 7,921,281 B2 | 4/2011 | Kurata et al. | |
| 7,930,520 B2 | 4/2011 | Kurata et al. | |
| 8,006,076 B2 | 8/2011 | Kurata et al. | |
| 8,141,098 B2 | 3/2012 | Bradford et al. | |
| 2002/0194433 A1 | 12/2002 | Yamazaki | |
| 2003/0149864 A1* | 8/2003 | Furukawa et al. | 712/228 |
| 2005/0027941 A1* | 2/2005 | Wang et al. | 711/121 |
| 2005/0132142 A1* | 6/2005 | Batcher | 711/135 |
| 2005/0138627 A1 | 6/2005 | Bradford et al. | |
| 2006/0161735 A1 | 7/2006 | Kiyota et al. | |
| 2007/0083865 A1* | 4/2007 | Hemmi | 718/100 |
| 2008/0201529 A1 | 8/2008 | Bradford et al. | |
| 2008/0201565 A1 | 8/2008 | Bradford et al. | |
| 2008/0209162 A1 | 8/2008 | Furukawa et al. | |
| 2008/0209168 A1 | 8/2008 | Yokota | |
| 2008/0209192 A1 | 8/2008 | Furukawa et al. | |
| 2008/0215858 A1 | 9/2008 | Furukawa et al. | |
| 2009/0125913 A1 | 5/2009 | Bradford et al. | |
| 2011/0113220 A1 | 5/2011 | Morishita | |
| 2011/0283288 A1 | 11/2011 | Kurata et al. | |

FOREIGN PATENT DOCUMENTS

| | | |
|---|---|---|
| JP | 2003-271399 A | 9/2003 |
| JP | 3620473 B2 | 2/2005 |
| JP | 2006-099332 A | 4/2006 |
| JP | 2006-155204 A | 6/2006 |
| JP | 3813930 B2 | 8/2006 |
| WO | WO-2009/153977 A1 | 12/2009 |

OTHER PUBLICATIONS

Chinese Office Action issued in Chinese Patent Application No. 201180017753.8 dated Sep. 28, 2014.
Chinese Search Report issued in Chinese Patent Application No. 201180017753.8 dated Aug. 15, 2014, with English Translation.

* cited by examiner

MULTI-THREADED PROCESSOR CONTEXT SWITCHING WITH MULTI-LEVEL CACHE

CROSS REFERENCE TO RELATED APPLICATIONS

This is a continuation application of PCT Patent Application No. PCT/JP2011/000015 filed on Jan. 6, 2011 designating the United States of America, which is based on and claims priority of Japanese Patent Application No. 2010-112657 filed on May 14, 2010. The entire disclosures of the above-identified applications, including the specifications, drawings and claims are incorporated herein by reference in their entirety.

FIELD

The present invention relates to a computer system which allows a virtual multiprocessor, including at least two or more virtual processors VP to be run on time-sharing, to efficiently access a multi-level cache memory.

BACKGROUND

Computer systems increasingly acquire various kinds of functions, while the systems become more complex. Meanwhile, the multi-thread programming on software, such as POSIX software threads (See Non-Patent Literatures 1 and 2, for example), suffers from performance isolation between the software threads and causes difficulty in system designing. In recent years, such techniques as a multi-core processor, the hardware multithreading (See Non-Patent Literature 3, for example), and the virtual multiprocessor (See Patent Literature 1, for example) are advancing in order to facilitate independent performance designing for a variety of functions.

Furthermore, in order to make it easier to implement performance designing for each of the processor core, the threads, and the virtual processor, a proposal in for example Patent Literature 2 shows a mechanism for a cache memory affecting a processing performance. For each of the processors, the mechanism separates multiple ways of an on-chip cache memory shared by processors, and manages the separated multiple ways.

It is noted that granularity for switching software threads is typically set coarse, such as a long period between several hundreds of microseconds and several seconds. This is because the software processing for the switching causes overhead. In the multi-core processor and the hardware multithreading, multiple programs can be simultaneously run. A typical virtual multiprocessor switches its processors in granularity of several hundreds of microseconds.

CITATION LIST

Patent Literature

[PTL 1] Japanese Patent No. 3813930
[PTL 2] Japanese Patent No. 3620473

Non Patent Literature

[NPL 1] Bradford Nichols, Dick Buttlar, Jacqueline Proulx Farrell, "Pthreads Programming", O'Reilly Japan, May 1, 1998
[NPL 2] David R. Butenhof, "Programming with POSIX", ASCII Addison-Wesley, November, 1998
[NPL 3] "Intel (R) hyper-threading technology", searched on line on Apr. 5, 2010

SUMMARY

Technical Problem

In recent years, computer systems have been required to achieve both a higher performance with faster speed and easier independent performance designing for each function in order to cope with the increasing number of functions in various kinds. Even a processor core for embedded devices runs fast over a speed of 1 GHz. In making a faster processor, however, the problem is the operation speed of a memory (memory on a higher level) placed near the processor core. For a level-1 cache memory placed near the processor core, the technique for partitioning a memory shown in Patent Literature 2 either increases the number of ways or complicates a partitioning control circuit. This problem can be an obstacle to a faster speed. In addition, as more processor cores, hardware multithreads, and virtual processors are installed, the number of ways to be separated and cache lines proportionally increases. Those problems inevitably require a level-1 cache memory having larger capacity. Such a cache memory with larger capacity is an obstacle to a faster speed.

The present invention is conceived in view of the above problems and has an object to provide a computer system which (i) achieves a higher performance with faster speed and easier independent performance designing for each function and (ii) eliminates the need for a high-capacity cache memory.

Solution to Problem

In order to achieve the above objectives, a computer system according to an aspect of the present invention includes: a main storage unit which holds data; a first processing executing unit which is provided in a first processor capable of virtual multiprocessing, and which sequentially executes processing to be executed on virtual processors; a first shared cache memory which is shared among the virtual processors, and which holds data to be used by the virtual processors; a partitioned cache memory which is provided on a storage level lower than the first shared cache memory, and which includes storage areas that are partitioned based on the number of the virtual processors, the storage areas each (i) corresponding to one of the virtual processors and (ii) holding the data to be used by the corresponding one of the virtual processors; a first context memory which holds, for each of the virtual processors, a context item corresponding to the virtual processor; a virtual processor control unit which, according to a request for switching of the virtual processors that execute processing in the first processing executing unit, (i) saves on the first context memory a context item of one of the virtual processors executing processing in the first processing executing unit and (ii) sets, to the first processing executing unit, a context item held in the first context memory and designated to an other one of the virtual processors to execute processing next in the first processing executing unit; a first shared cache control unit which, in the case where a cache miss occurs in the first shared cache memory, performs control for (i) reading missing data from the partitioned cache memory and (ii) writing the read missing data to the first shared cache memory; and a partitioned cache control unit which, in the case where a cache miss occurs in the partitioned cache memory, performs control for (i) reading missing data from the main storage unit and (ii) writing the read missing data to one of the storage areas which corresponds to one of the virtual processors executing processing in the first processing executing unit.

Hence, in the case where the first shared cache memory does not hold data requested by a virtual processor whose processing is executed in the first processing executing unit, the data is read from the partitioned cache memory. The data access to the partitioned cache memory can be made faster than that to the main storage unit. This feature contributes to reducing a switching loss which occurs when the virtual processors are switched. Hence, the feature makes it easy to implement performance designing for each virtual processor, while simplifying a circuit for the first shared cache memory placed near the first processor. This facilitates the development of a faster first processor. Moreover, this feature allows the first shared cache memory near the first processor to be shared. Thus, the first shared cache memory requires just a small capacity for caching, which contributes to decreasing chip costs. Consequently, the feature successfully provides a computer system which (i) achieves a higher performance with faster speed and easier independent performance designing for each function and (ii) eliminates the need for a high-capacity cache memory.

The above computer system may further include: a second processing executing unit which is provided in a second processor capable of virtual multiprocessing, and sequentially executes processing to be executed on the virtual processors, the second processor being different from the first processor; a second shared cache memory which is shared among the virtual processors that execute processing in the second processing executing unit, which holds data to be used by the virtual processors, and which is provided on a storage level higher than the partitioned cache memory; a second shared cache control unit which, in the case where a cache miss occurs in the second shared cache memory, performs control for (i) reading missing data from the partitioned cache memory and (ii) writing the read missing data to the second shared cache memory; and a consistency maintaining unit which executes processing for maintaining consistency between the data held in the first shared cache memory and the data held in the second shared cache memory, wherein the virtual processor control unit may, according to a request for switching of the virtual processors that execute processing in the second processing executing unit, further (i) save on the first context memory a context item of one of the virtual processors executing processing in the second processing executing unit and (ii) set, to the second processing executing unit, a context item held in the first context memory and designated to an other one of the virtual processors to execute processing next in the second processing executing unit, and the partitioned cache control unit may, in the case where a cache miss occurs in the partitioned cache memory, perform control for (i) reading missing data from the main storage unit and (ii) writing the read missing data to one of the storage areas corresponding to one of the virtual processors executing processing in either the first processing executing unit or the second processing executing unit.

Hence, when a computer system includes multiple virtual multiprocessors, the above feature makes it easy to implement performance designing for each virtual processor, while simplifying circuits for the first shared cache memory and the shared cache memory respectively placed near the first processor and the second processor. This facilitates the development of faster first and second processors.

The first processor may include hardware threads and may be capable of multithreading, the first processing executing unit may execute threads using hardware, the computer system may further include: a second processing executing unit which is provided in the first processor, and executes threads using hardware and sequentially executes processing to be executed on the virtual processors; a second shared cache memory which is shared among the virtual processors that execute processing in the second processing executing unit, which holds data to be used by the virtual processors, and which is provided on a storage level higher than the partitioned cache memory; a second shared cache control unit which, in the case where a cache miss occurs in the second shared cache memory, performs control for (i) reading missing data from the partitioned cache memory and (ii) writing the read missing data to the second shared cache memory; and a consistency maintaining unit configured to execute processing for maintaining consistency between the data held in the first shared cache memory and the data held in the second shared cache memory, wherein the virtual processor control unit may, according to a request for switching of the virtual processors that execute processing in the second processing executing unit, further (i) save on the first context memory a context item of one of the virtual processors executing processing in the second processing executing unit and (ii) set, to the second processing executing unit, a context item held in the first context memory and designated to an other one of the virtual processors to execute processing next in the second processing executing unit, and the partitioned cache control unit may, in the case where a cache miss occurs in the partitioned cache memory, perform control for (i) reading missing data from the main storage unit and (ii) writing the read missing data to one of the storage areas corresponding to one of the virtual processors executing processing in either the first processing executing unit or the second processing executing unit.

Hence, when a computer system includes a first processor having two or more hardware threads and capable of multithreading, the above feature makes it easy to implement performance designing for each virtual processor, while simplifying a circuit for the first shared cache memory placed near the first processor. This facilitates the development of a faster first processor.

The above computer system may further include: a third processing executing unit and a fourth processing executing unit each provided in a second processor including hardware threads and is capable of multithreading, and executes threads using hardware and sequentially executes processing to be executed on the virtual processors, the second processor being different from the first processor; a third shared cache memory which is shared among the virtual processors that execute processing in the third processing executing unit, which holds data to be used by the virtual processors, and which is provided on a storage level higher than the partitioned cache memory; a third shared cache control unit which, in the case where a cache miss occurs in the third shared cache memory, performs control for (i) reading missing data from the partitioned cache memory and (ii) writing the read missing data to the third shared cache memory; a fourth shared cache memory which is shared among the virtual processors that execute processing in the fourth processing executing unit, which holds data to be used by the virtual processors, and which is provided on a storage level higher than the partitioned cache memory; and a fourth shared cache control unit which, in the case where a cache miss occurs in the fourth shared cache memory, performs control for (i) reading missing data from the partitioned cache memory and (ii) writing the read missing data to the fourth shared cache memory, wherein the consistency maintaining unit may execute processing for maintaining consistency among the data held in the first shared cache memory, the data held in the second shared cache memory, the data held in the third shared cache memory, and the data held in the fourth shared cache memory, the virtual processor control unit: may further, according to a request for switching of the virtual processors that execute processing in the third processing executing unit, (i) save on the first context memory a context item of one of the virtual processors executing processing in the third processing executing unit and (ii) set, to the third processing executing unit, a context item held in the first context memory and designated to an other one of the virtual processors to execute processing next in the third processing executing unit; and may further (i) save on the first context memory a context item of one of the virtual processors executing processing in the fourth processing executing unit, and (ii) set, to the fourth processing executing unit, a context item held in the first context memory and designated to an other one of the virtual processors to execute processing next in the fourth processing executing unit, and the partitioned cache control unit may, in the case where a cache miss occurs in the partitioned cache memory, perform control for (i) reading missing data from the main storage unit and (ii) writing the read missing data to one of the storage areas corresponding to one of the virtual processors executing processing in one of the first processing executing unit, the second processing executing unit, the third processing executing unit, and the fourth processing executing unit.

Hence, when a computer system includes multiple processors each having two or more hardware threads and capable of multithreading, the above feature makes it easy to implement performance designing for each virtual processor, while simplifying circuits for each of the first to fourth shared cache memories placed near the processors. This facilitates the development of faster processors.

The above computer system may include: a third processing executing unit and a fourth processing executing unit each provided in a second processor including hardware threads and is capable of multithreading, and executes threads using hardware and sequentially executes processing to be executed on the virtual processors, the second processor being different from the first processor; a third shared cache memory which is shared among the virtual processors that execute processing in the third processing executing unit, which holds data to be used by the virtual processors, and which is provided on a storage level higher than the partitioned cache memory; a third shared cache control unit which, in the case where a cache miss occurs in the third shared cache memory, performs control for (i) reading missing data from the partitioned cache memory and (ii) writing the read missing data to the third shared cache memory; a fourth shared cache memory which is shared among the virtual processors that execute processing in the fourth processing executing unit, which holds data to be used by the virtual processors, and which is provided on a storage level higher than the partitioned cache memory; a fourth shared cache control unit which, in the case where a cache miss occurs in the fourth shared cache memory, performs control for (i) reading missing data from the partitioned cache memory and (ii) writing the read missing data to the fourth shared cache memory; and a second context memory which holds, for each of the virtual processors to execute processing in the third processing executing unit and the fourth processing executing unit, a context item corresponding to the virtual processor, wherein the first context memory may hold the context item corresponding to one of the virtual processors executing processing in the first processing executing unit and the second processing executing unit, the consistency maintaining unit may execute processing for maintaining consistency among the data held in the first shared cache memory, the data held in the second shared cache memory, the data held in the third shared cache memory, and the data held in the fourth shared cache memory, the virtual processor control unit: may further, according to a request for switching of the virtual processors that execute processing in the third processing executing unit, (i) save on the second context memory a context item of one of the virtual processors executing processing in the third processing executing unit, and (ii) set, to the third processing executing unit, a context item held in the second context memory and designated to an other one of the virtual processors to execute processing next in the third processing executing unit; and may further, according to a request for switching of the virtual processors that execute processing in the fourth processing executing unit, (i) save on the second context memory a context item of one of the virtual processors executing processing in the fourth processing executing unit and (ii) set, to the fourth processing executing unit, a context item held in the second context memory and designated to an other one of the virtual processors to execute processing next in the fourth processing executing unit, and the partitioned cache control unit may, in the case where a cache miss occurs in the partitioned cache memory, perform control for (i) reading missing data from the main storage unit and (ii) writing the read missing data to one of the storage areas corresponding to one of the virtual processors executing processing in one of the first processing executing unit, the second processing executing unit, the third processing executing unit, and the fourth processing executing unit.

Hence, when a computer system includes multiple processors each having two or more hardware threads and capable of multithreading, the above feature makes it easy to implement performance designing for each virtual processor, while simplifying circuits for each of the first to fourth shared cache memories placed near the processors. This facilitates the development of faster processors.

The above context item may include cache assignment information indicating one of the storage areas which is (i) included in the partitioned cache memory and (ii) associated with one of the virtual processors which corresponds to the context item, and the partitioned cache control unit may, in the case where a cache miss occurs in the partitioned cache memory, perform control for (i) reading missing data from the main storage unit and (ii) writing the read missing data to one of the storage areas corresponding to one of the virtual processors which causes the cache miss and is found when the partitioned cache control unit refers to the context items held in the first context memory.

Hence, in the case where a cache miss develops in the partitioned cache memory, the feature makes it possible to write missing data to a storage area corresponding to one of the virtual processors which causes the cache miss.

The partitioned cache memory may be partitioned into the storage areas either for each of ways according to a cache scheme of an N-way set associative or for each of cache lines.

Such a feature makes it possible to easily specify data-to-be-switched in the partitioned cache memory, and to easily implement performance designing for each virtual processor.

The context item may hold information indicating (i) positions and the number of the ways or (ii) positions and the number of the cache lines, the ways or the cache lines being provided on the partitioned cache memory, and the ways or the cache lines being exclusively used by the virtual processors.

Such a feature facilitates setting of partition and assignment of the storage areas in the partitioned cache memory.

It is noted that, instead of being implemented as a computer system including such characteristic processing units, the present invention may be implemented as a computing method achieving as steps the processing executed by the characteristic processing units included in the computer system. Furthermore, the present invention may be implemented as a program to cause a computer to execute the characteristic steps included in the computing method. As a matter of course, such a program may be distributed via a non-volatile and computer-readable recording medium, such as a compact disc-read only memory (CD-ROM), and a communications network, such as the Internet.

Advantageous Effects

The present invention successfully provides a computer system which (i) achieves a higher performance with faster speed and easier independent performance designing for each function and (ii) eliminates the need for a high-capacity cache memory.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, embodiments of a computer system are described with reference to the drawings. It is noted in the embodiments that constitutional elements which share the same numerical reference have a similar structure and carry out a similar operation. Thus, the details of such constitutional elements can be omitted.

In the embodiments, a shared cache memory and a partitioned cache memory in the claims are referred to as a level-1 cache memory and a level-2 cache memory, respectively.

Embodiment 1

Figure 1:
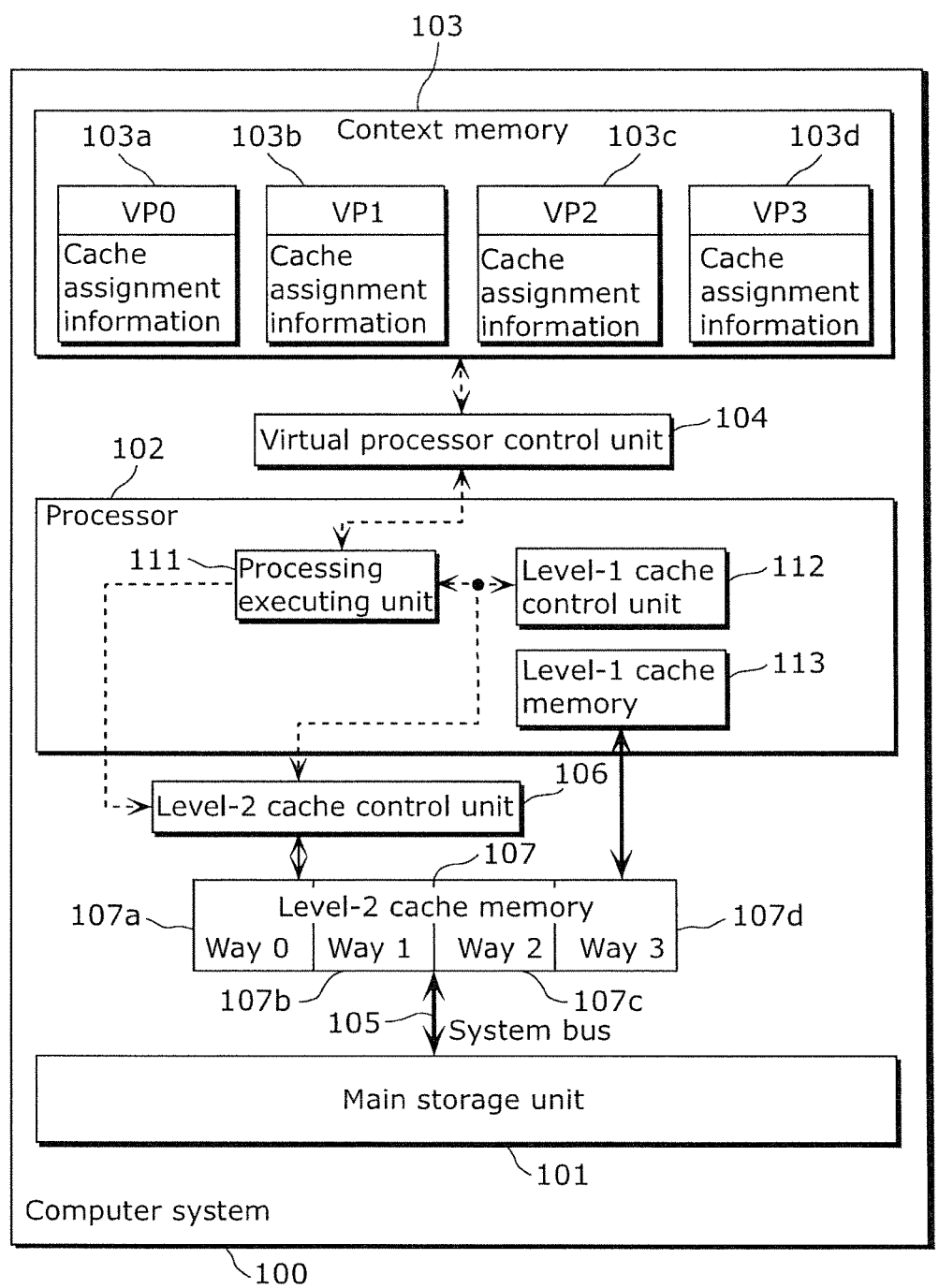
FIG. 1 depicts a block diagram showing a hardware structure of a computer system according to Embodiment 1.

FIG. 1 depicts a block diagram showing a hardware structure of a computer system according to Embodiment 1. A computer system 100 includes a main storage unit 101, a processor 102, a context memory 103, a virtual processor control unit 104, a level-2 cache control unit 106, and a level-2 cache memory 107.

The context memory 103 holds context of multiple virtual processors VP (For the sake of simplicity, there are four virtual processors VP and each of the virtual processors VP is hereinafter referred to as virtual processors VP 0, VP 1, VP 2, and VP 3). Here, the context includes a context item 103a for the virtual processor VP 0, a context item 103b for the virtual processor VP 1, a context item 103c for the virtual processor VP 2, and a context item 103d for the virtual processor VP 3.

It is noted that FIG. 1 shows an implementation of the present invention. Hence, the number of the context memories shall not be limited to four in the present invention. Furthermore, the level-2 cache memory 107 is an N-way (N=4) set associative. It is noted that in the present invention, the number of ways shall not be limited, and the cache scheme shall not be limited to the N-way set associative.

The main storage unit 101 is connected to the processor 102 via a system bus 105 and the level-2 cache memory 107. In response to a request from the processor 102, the main storage unit 101 reads the data held in the main storage unit 101 itself, and transfers the data to the level-2 cache memory 107. In response to a request from the processor 102, writing to the main storage unit 101 is carried out in a similar manner.

The processor 102 includes a processing executing unit 111, a level-1 cache control unit 112, and a level-1 cache memory 113. It is noted that the level-1 cache memory 113 is shared among virtual processors VP.

The processor 102 is accessible to the main storage unit 101 either through one of the level-1 cache memory 113 and the level-2 cache memory 107 or without involving either of them. Since this is not the main point of the present invention, an illustration of a connecting line between the processor 102 and the main storage unit 101 shall be omitted in FIG. 1.

Figure 2:
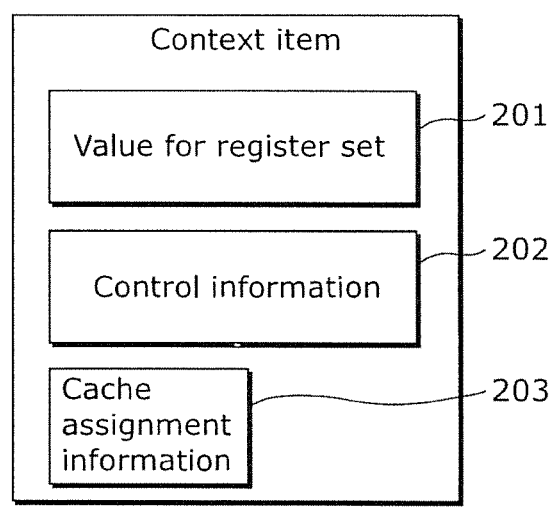
FIG. 2 shows information on context according to Embodiment 1.

As described above, the context memory 103 holds information necessary for implementing the virtual processors VP. FIG. 2 shows information held in one context item. The context item includes a value 201 for a register set included in the processing executing unit 111, control information 202 indicating a position of program execution, and cache assignment information 203 for the level-2 cache memory 107. As many context items as the virtual processors VP are held in the context memory 103. Here, the cache assignment information 203 indicates a correspondence relationship between ways in the level-2 cache memory 107 and the virtual processors VP.

The virtual processor control unit 104 switches the virtual processors VP. In other words, the virtual processor control unit 104 first writes a context item, of a virtual processor VP executing processing in the processing executing unit 111, to an appropriate storage location in the context memory 103. Then, the virtual processor control unit 104 selects the next virtual processor VP to execute processing. In addition, the virtual processor control unit 104 sets, to the processing executing unit 111, a context item (one of the context items 103a, 103b, 103c and 103d) held in the context memory 103 and designated to the selected virtual processor VP. The virtual processor control unit 104 executes such a sequence of operations to implement multiple virtual processors VP. It is noted that the virtual processors VP may be selected according to, for example, the round robin, or predetermined priorities of the virtual processors VP. The present invention shall not limit how to select the virtual processors VP.

When the virtual processor control unit 104 sets to the processing executing unit 111 context items for the virtual processors VP to be executed, the processing executing unit 111 sequentially executes the programs of the virtual processors VP. Hence, the virtual processors VP execute processing. Furthermore, the processing executing unit 111 sends, to the level-2 cache control unit 106, the cache assignment information 203 included in the context item of a virtual processor VP.

The level-1 cache control unit 112 checks whether or not data of a request address from the processing executing unit 111 is found on a cache line in the level-1 cache memory 113. In the case where there is no data of the request address in the level-1 cache memory 113, a cache miss develops. The level-1 cache control unit 112 notifies the level-2 cache control unit 106 of the request address.

The level-1 cache memory 113 is a typical cache memory to be used for a processor. The cache memory is shared among multiple virtual processors VP.

The level-2 cache control unit 106 is notified by the processing executing unit 111 of the cache assignment information 203. In the case of receiving the request address from the level-1 cache control unit 112, the level-2 cache control unit 106 checks whether or not the data of the received request address is found on a cache line in the level-2 cache memory 107. In the case where the data of the request address is found, the level-2 cache control unit 106 outputs to the level-1 cache control unit 112 the data of the request address. The level-1 cache control unit 112 caches a target address on the cache line in the level-1 cache memory 113. In the case where a cache miss develops, the level-2 cache control unit 106 refers to the cache assignment information 203 and caches the data of the request address in a target way included in the level-2 cache memory 107.

The level-2 cache memory 107 is a typical cache memory to be used for a processor. The level-2 cache memory 107 is a 4-way set associative. The level-2 cache memory 107 is partitioned for each way. For each way, a virtual processor VP is designated. Here, a way 0 (a way 107*a*) is assigned to the virtual processor VP 0 (the context item 103*a*). A way 1 (a way 107*b*) is assigned to the virtual processor VP 1 (the context item 103*b*). A way 2 (a way 107*c*) is assigned to the virtual processor VP 2 (the context item 103*c*). A way 3 (a way 107*d*) is assigned to the virtual processor VP 3 (the context item 103*d*). The above information indicating which way is assigned to which virtual processor VP is included in a context item as the cache assignment information 203. It is noted that in Embodiment 1 a virtual processor VP is assigned for each way. Instead, a virtual processor VP may be assigned for each of cache lines in the level-2 cache memory 107 (See Cited Reference 1) and the information indicating a correspondence relationship between the cache lines and the virtual processors VP may be used as the cache assignment information 203. Here, the cache assignment information 203 indicates for each virtual processor VP either (i) positions and the number of the ways or (ii) positions and the number of the cache lines, the ways and the cache lines being included in the level-2 cache memory 107 and each assigned to a corresponding one of the virtual processors VP. The information may be designated from software. As a matter of course, such a feature allows more flexible control of the computer system 100.

[Cited Reference 1]

Computer Organization and Design by Patterson and Hennessy, Vol. 1, Second Edition, Nikkei Business Publications Inc., Chapter 7, Item 7.2.

Described next is how the computer system 100 operates, with reference to the flowchart in FIG. 3. For the sake of simplicity, the computer system 100 utilizes the round robin to select the virtual processors VP. In other words, the virtual processors VP run in the order of VP 0, VP 1, VP 2, VP 3, and VP 0 (subsequently, the sequence repeats). Suppose the virtual processor VP 0 (the context item 103*a*) is currently running.

(Step S301) First, the virtual processor control unit 104 determines whether or not the processor 102 sends a request for switching the virtual processors VP. In the case where there is no request for switching, the sequence proceeds to Step S304. In the case where the request for switching is sent, the sequence proceeds to Step S302.

(Step S302) The virtual processor control unit 104 selects the next virtual processor VP to execute processing. Here, suppose the virtual processor VP 1 (the context item 103*b*) is selected.

(Step S303) The virtual processor control unit 104 switches the virtual processors VP. In the above case, the processing executing unit 111 stops the execution of the virtual processor VP 0 (the context item 103*a*). Then, the virtual processor control unit 104 saves the context item of the virtual processor VP 0 on the context item 103*a* in the context memory 103, and sets, to the processing executing unit 111, the context (the context item 103*b*) of the virtual processor VP 1 that executes processing next.

(Step S304) During an allowed time period according to the round robin, the processing executing unit 111 executes the programs of the virtual processors VP set to the processing executing unit 111. Hence, the virtual processors VP execute programs.

(Step S305) While the virtual processors VP are executing the programs, the level-1 cache control unit 112 determines whether or not the data of the request address from the processing executing unit 111 is found on a cache line in the level-1 cache memory 113. In the case where no such data is found, the level-1 cache control unit 112 determines that a cache miss has developed, and notifies the level-2 cache control unit 106 of the request address. Then, the sequence proceeds to Step S306. In the case where the data is found, the sequence proceeds to Step S301.

(Step S306) The level-2 cache control unit 106 determines whether or not the data of the request address from the level-1 cache control unit 112 is found on a cache line in the level-2 cache memory 107. Here, the level-2 cache control unit 106 also determines whether or not the data of the request address is found in other ways than the way 1 (the way 107*b*) which is assigned to the currently running virtual processor VP 1. In the case where the data of the request address is found on a cache line in the level-2 cache memory 107, the sequence proceeds to Step S307. In the case where no such data is found, the sequence proceeds to Step S308.

(Step S307) Through the level-1 cache control unit 112, the level-2 cache control unit 106 transfers, to a cache line of the level-1 cache memory 113, the data on an appropriate cache line in the level-2 cache memory 107.

(Step S308) With reference to the cache assignment information 203, the level-2 cache control unit 106 transfers the data of the request address from the main storage unit 101 to the way 1 (the way 107*b*) assigned to the virtual processor VP 1 and included in the level-2 cache memory 107. Furthermore, through the level-1 cache control unit 112, the level-2 cache control unit 106 simultaneously transfers the transferred data to the level-1 cache memory 113 as well.

In the computer system 100, the context items of the virtual processors VP are switched during an allowed time period according to the round robin while the Steps S301 to S308 are repeated. Hence, an operating environment is provided for the virtual processors VP.

It is noted that the level-1 cache memory 113 is shared among the virtual processors VP. This structure inevitably requires cache information to be updated for each switching period of the virtual processors VP, and develops a time loss. However, required processing cycles are extremely small for the data transfer from the level-2 cache memory 107 to the level-1 cache memory 113. Consequently, the influence of the data transfer on the system performance is successfully curbed to an extremely degree.

Suppose, for example, the level-1 cache memory 113 has a storage capacity of 16 kilobytes, and 20 cycles are required for the data transfer of 1 cache line (128 bytes) between the level-1 cache memory 113 and the level-2 cache memory 107. Furthermore, a processor core in the processor 102 has a frequency clock of 1 GHz, and a switching period of the virtual processors VP is 100 μsecs. Here, 16×1024/128×20=2560 of processing cycles are required for fetching all the data held in the level-1 cache memory 113. Thus, only 2560/(100 μsecs×1 GHz)×100=2.56% is a switching loss rate for a switching period of the virtual processors VP.

In the case where the level-2 cache memory 107 is not partitioned for each of the virtual processors VP, the access to the main storage unit 101 is slow and the system performance significantly decreases. For example, 200 cycles are required for data transfer of 1 cache line (128 bytes) between the level-2 cache memory 107 and the main storage unit 101. Here, when a calculation similar to the above is carried out, 26.5% of the switching period of the virtual processors VP is a switching loss. This results in a significant decrease in system performance.

Moreover, the switching with granularity of 100 μsecs in software threads takes up most of 100 μsecs by the software threads switching processing. Thus, such switching is highly difficult in the first place.

As described above, in Embodiment 1, a cache memory placed near a processor core is shared among virtual processors VP. Then, for each of the virtual processors VP, assigned is one of storage areas (ways) included in a cache memory placed apart from the processor core. This feature contributes to reducing a switching loss which occurs when the virtual processors VP are switched. Furthermore, the feature makes it easy to implement performance designing for each virtual processor VP, while simplifying a circuit for the cache memory placed near the processor core. This facilitates the development of a faster processor. Moreover, this feature allows the cache memory near the processor core to be shared. Thus, the cache memory requires just a small capacity for caching, which contributes to decreasing chip costs. In the Description, the cache memory near the processor core refers to a cache memory on a higher level. The cache memory apart from the processor core refers to a cache memory on a lower level. According to a comparison of a level-1 cache memory and a level-2 cache memory, for example, the former is near the processor core; that is, a higher-level cache memory, and the later is apart from the processor core; that is, a lower-level cache memory.

In Embodiment 1, a cache memory near the processor core is shared and a cache memory apart from the processor core is partitioned. Embodiment 1 does not limit does not limit either the level of a shared memory or the level of partitioned memory to a particular level. For example, a level-2 cache memory may be shared, and a level-3 cache memory may be partitioned.

In Embodiment 1, the number of ways in the level-2 cache memory 107 shall not be limited, and the cache scheme shall not be limited to the N-way set associative.

In Embodiment 1, the level-2 cache memory 107 does not necessarily have to be partitioned for each way; instead, the level-2 cache memory 107 may be partitioned for each bundle of cache lines. Embodiment 1 does not limit how to bundle the cache lines in particular.

In Embodiment 1, there is no limit to the number of virtual processors VP held in the context memory 103.

In Embodiment 1, a virtual processor VP scheduling scheme may be a scheme other than the round robin and a scheme to select virtual processors VP-to-run based on priorities. Embodiment 1 does not limit the virtual processor scheduling scheme.

In Embodiment 1, a cache replacement algorithm may be the least recently used (LRU) algorithm or may be based on priorities and use frequency. Embodiment 1 does not limit the cache replacement algorithm.

In Embodiment 1, the cache assignment information 203 may be set either from software or hardware. Embodiment 1 does not limit how to set the cache assignment information 203.

Embodiment 2

Hereinafter described is a computer system according to Embodiment 2, with reference to the drawings. The computer system according to Embodiment 1 includes one processor; instead, the computer system according to Embodiment 2 includes two processors.

Figure 4:
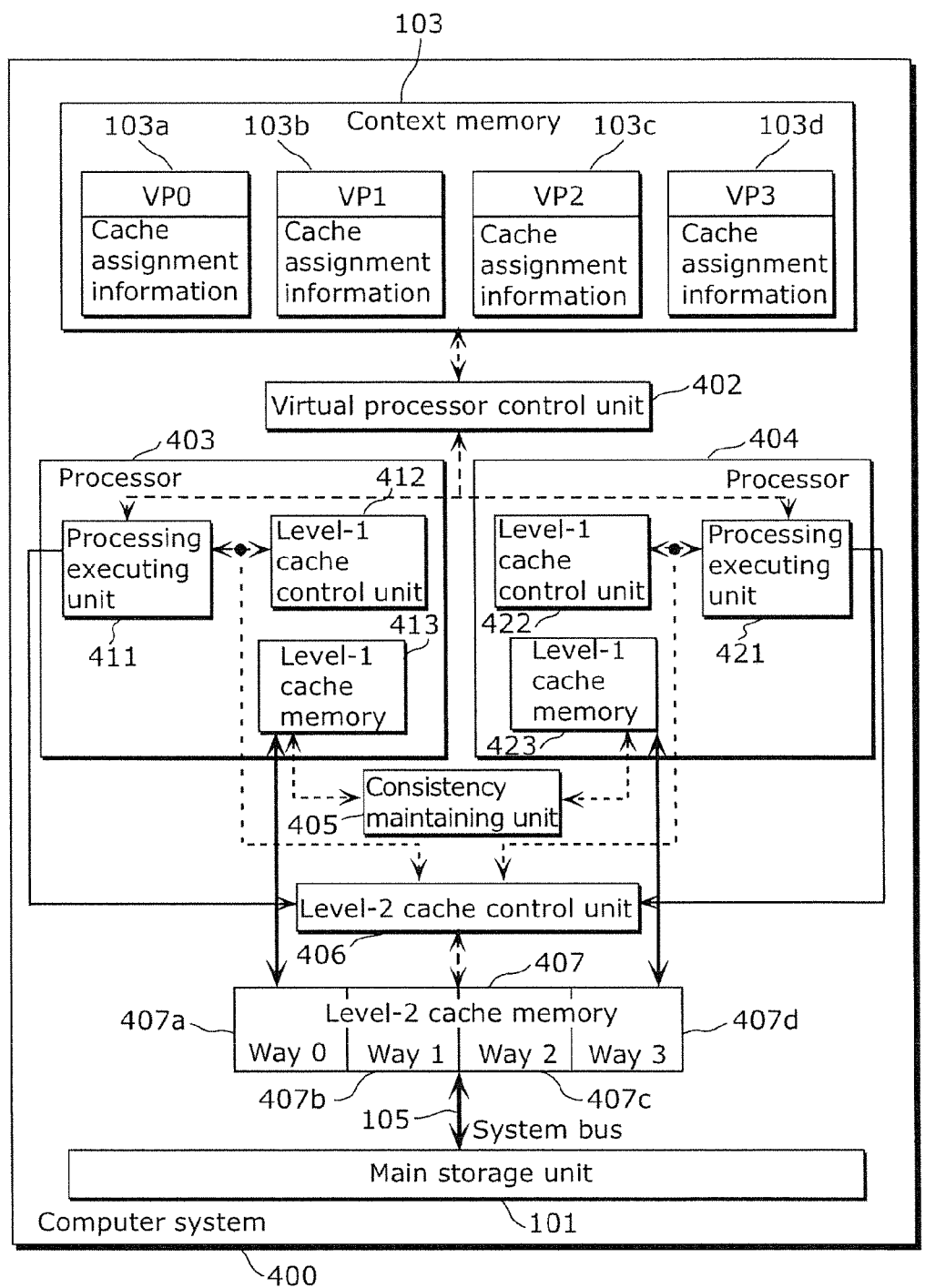
FIG. 4 depicts a block diagram showing a hardware structure of a computer system according to Embodiment 2.

FIG. 4 depicts a block diagram showing a hardware structure of a computer system according to Embodiment 2. A computer system 400 includes a virtual processor control unit 402, two processors 403 and 404, the context memory 103, a consistency maintaining unit 405, a level-2 cache control unit 406, a level-2 cache memory 407, and the main storage unit 101. It is noted that FIG. 4 shows an implementation of the present invention. Hence, in the present invention, the number of the processors may be three or more and the number of the context memories shall not be limited to four. In the description below, constitutional elements which share the same numerical reference seen in FIG. 1 carry out a similar function. Thus, the details thereof shall be omitted.

The processor 403 includes a processing executing unit 411, a level-1 cache control unit 412, and a level-1 cache memory 413. The processor 404 includes a processing executing unit 421, a level-1 cache control unit 422, and a level-1 cache memory 423. Each of the processing executing units 411 and 421 has the same functions as processing executing unit 111 in FIG. 1 has. Each of the level-1 cache control units 412 and 422 has the same functions as the level-1 cache control unit 112 in FIG. 1 has. Each of the level-1 cache memories 413 and 423 has the same function as the level-1 cache memory 113 in FIG. 1 has. Thus, the details thereof shall be omitted.

The processor 403 or the processor 404 is accessible to the main storage unit 101 through one of (i) either the level-1 cache memory 413 or the level-1 cache memory 423 and (ii) the level-2 cache memory 407. The processor 403 or the processor 404 is also accessible to the main storage unit 101 without involving any of them. Since this memory access is not the main point of the present invention, an illustration of a connecting line between the main storage unit 101 and one of the processors 403 and 404 shall be omitted in FIG. 4.

When the virtual processor control unit 402 sets to one of the processing executing units 411 and 412 context items for virtual processors VP to be executed, the processing executing units 411 or 421 sequentially executes the programs of the virtual processors VP. Hence, the virtual processors VP execute processing. Furthermore, one of the processing executing units 411 and 421 sends, to the level-2 cache control unit 406, (i) the cache assignment information 203 included in the context item of a virtual processor VP and (ii) a processor ID for identifying whether the sending processor is either the processor 403 or the processor 404.

The virtual processor control unit 402 switches the virtual processors VP in each of the processors 403 and 404. First, the virtual processor control unit 402 writes, to an appropriate storage location in the context memory 103, a context item of a virtual processor VP executing processing in the processing executing unit 411 (or 421) of the processor to perform the switching. Next, the virtual processor control unit 402 selects a virtual processor VP to be executed next. Then, the virtual processor control unit 402 sets, to the processing executing unit 411 (or 421) on which the switching is performed, a context item held in the context memory 103 and designated to the selected virtual processor VP. The virtual processor control unit 402 executes such a sequence of operations to implement multiple virtual processors VP. It is noted that the virtual processors VP may be selected according to, for example, the round robin, or predetermined priorities of the virtual processors VP.

The consistency maintaining unit 405 executes processing for maintaining consistency between the data held in the level-1 cache memory 413 and the data held in the level-1 cache memory 423. In other words, the consistency maintaining unit 405 secures the consistency of data shared between the processors using a known technique such as the cache snooping, in order to prevent inconsistency between the level-1 cache memories.

The level-2 cache control unit 406 is notified by the processing executing unit 111 (or 421) of the cache assignment information 203 and the processor ID. In the case of receiving the request address from the level-1 cache control unit 412 (or 422), the level-2 cache control unit 406 checks whether or not the data of the received request address is found on a cache line in the level-2 cache memory 407. In the case where the data of the request address is not found, the level-2 cache control unit 406 refers to the cache assignment information 203 and caches the data of the request address in a target way included in the level-2 cache memory 407. In the case where the data of the request address is found, the level-2 cache control unit 406 detects the processor ID, and outputs the data of the request address to the level-1 cache control unit 412 (or 422) included in the processor designated with the processor ID. The level-1 cache control unit 412 (or 422) caches the data of the received request address on a cache line in the level-1 cache memory 413 (or 423).

The level-2 cache memory 407 employs the cache scheme of the 4-way set associative. The level-2 cache memory 407 is partitioned for each way. For each way, a virtual processor VP is designated. Here, a way 0 (a way 407*a*) is assigned to the virtual processor VP 0 (the context item 103*a*). A way 1 (a way 407*b*) is assigned to the virtual processor VP 1 (the context item 103*b*). A way 2 (a way 407*c*) is assigned to the virtual processor VP 2 (the context item 103*c*). A way 3 (a way 407*d*) is assigned to the virtual processor VP 3 (the context item 103*d*). When receiving read requests or write requests from the processor 403 (or 404), the level-2 cache memory 407 reads or writes the data according to the order of reception of the requests. When simultaneously receiving the requests from the processors 403 and 404, the level-2 cache memory 407 gives the processor 403 a priority and processes the request from the processor 403. It is noted that in Embodiment 2, a virtual processor VP is assigned for each way. Instead, a virtual processor VP may be assigned for each of cache lines in the level-2 cache memory 407 (See Cited Reference 1), and the information indicating a correspondence relationship between the cache lines and the virtual processors VP may be used as the cache assignment information 203. Here, the cache assignment information 203 indicates for each virtual processor VP either (i) positions and the number of the ways or (ii) positions and the number of the cache lines, the ways and the cache lines being included in the level-2 cache memory 407 and assigned to the corresponding virtual processors VP. The information may be designated from software. As a matter of course, such a feature allows more flexible control of the computer system 400. It is noted that in the present invention, the number of ways shall not be limited, and the cache scheme shall not be limited to the N-way set associative.

Figure 5:
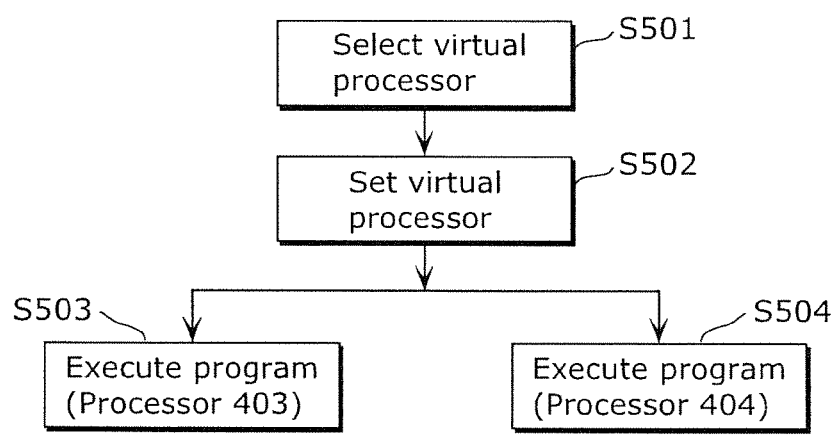
FIG. 5 depicts a flowchart for an operation of the computer system according to Embodiment 2.
Figure 6:
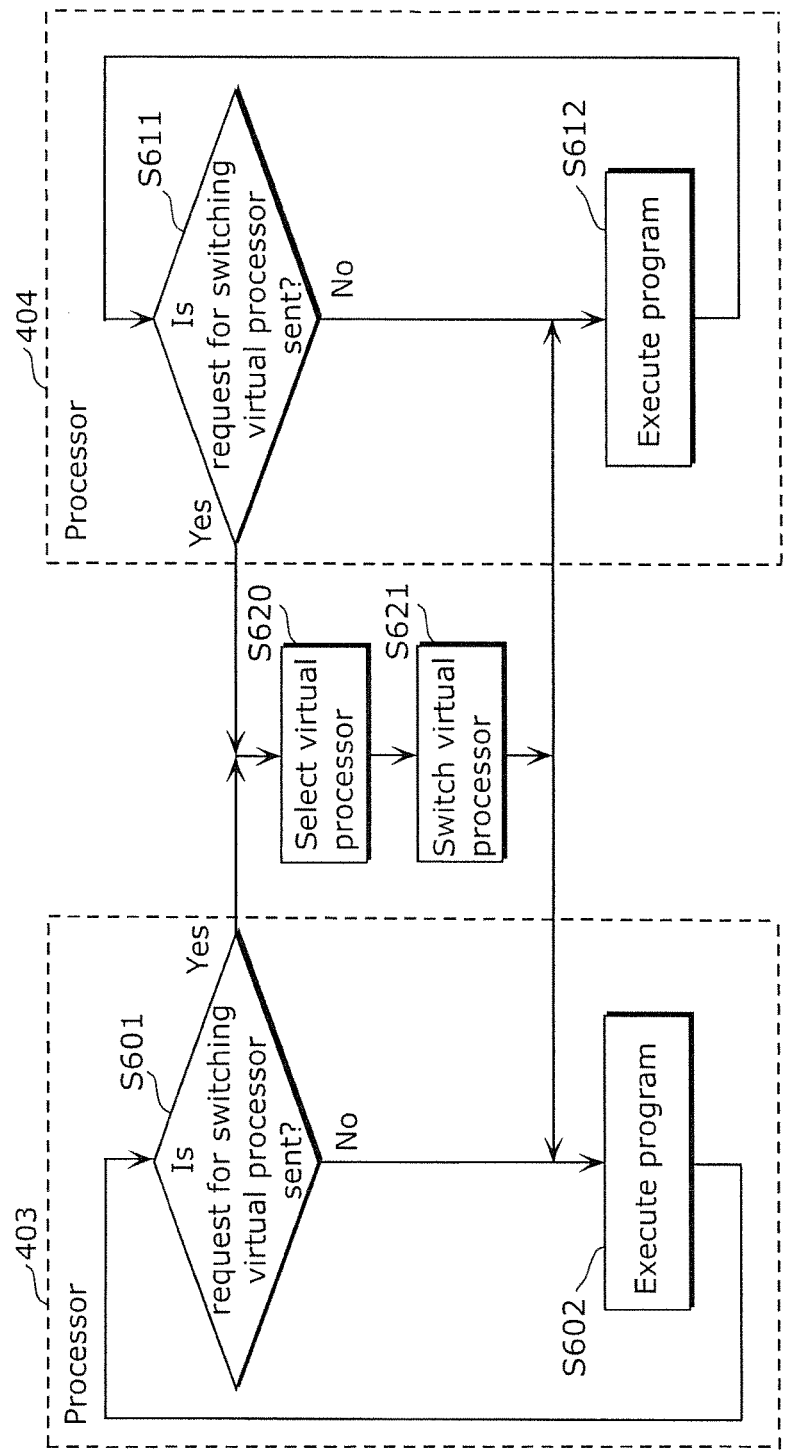
FIG. 6 depicts a flowchart for an operation of a processor in the computer system according to Embodiment 2.

Described next is how the computer system 400 operates, with reference to the flowchart in FIGS. 5 and 6. FIG. 5 shows an operation carried out when the computer system 400 is activated. FIG. 6 shows an operation for switching the virtual processors VP. For the sake of simplicity, the computer system 400 utilizes the round robin to select the virtual processors VP. In other words, the virtual processors VP run in the order of VP 0, VP 1, VP 2, VP 3, and VP 0 (subsequently, the sequence repeats).

FIG. 5 shows the operation carried out when the computer system 400 is activated.

(Step S501) The virtual processor control unit 402 selects a virtual processor VP according to a selection scheme of a virtual processor VP. Here, the virtual processor VP 0 (the context item 103*a*) is selected for the processor 403 and the virtual processor VP 1 (the context item 103*b*) is selected for the processor 404.

(Step S502) Next, the virtual processor control unit 402 sets the context item 103*a* of the virtual processor VP 0 to the processing executing unit 411 in the processor 403. Moreover, the virtual processor control unit 402 sets the context item 103*b* of the virtual processor VP 1 to the processing executing unit 421 in the processor 404. Here, there is no restriction on the setting order to the processors 403 and 404.

(Steps S503 and S504) Each of the processing executing unit has a corresponding one of the context items set. During an allowed time period according to the round robin, the processing executing unit 411 (or 421) executes the program of a virtual processor VP. When the program spends the allowed time period, the processing executing unit 411 (or 421) stops the execution and issues a request for switching the virtual processors VP to the virtual processor control unit 402.

Described next is the flow followed by the above state and observed when the virtual processors VP switch, with reference to FIG. 6. Exemplified here is the case where the program, of the virtual processor VP 0, executed on the processing executing unit 411 spends the allowed time period.

(Step S601) The virtual processor control unit 402 determines whether or not the processor 403 sends the request for switching the virtual processors VP. In the case where the request for switching is sent, the sequence proceeds to Step S620. In the case where there is no request for switching, the sequence proceeds to Step S602.

(Step S620) The virtual processor control unit 402 selects the next virtual processor VP to execute processing. Here, suppose the virtual processor VP 2 (the context item 103*c*) is selected. It is noted that when requests for switching the virtual processors VP are sequentially sent, the next virtual processor VP to execute processing is selected in the order of the processors that have sent the requests. When the requests for switching the virtual processors VP are simultaneously sent from the processors 403 and 404, a priority is given to the processor 403. In other words, the virtual processor control unit 402 first selects a virtual processor VP to run on the processor 403, and then selects another virtual processor VP to run on the processor 404.

(Step S621) The virtual processor control unit 402 switches the virtual processors VP. In the above case, the processing executing unit 411 stops the execution of the virtual processor VP 0. Then, the virtual processor control unit 402 saves the context item of the virtual processor VP 0 on the context item 103a in the context memory 103, and sets, to the processing executing unit 411, the context item 103c of the selected virtual processor VP 2.

Figure 3:
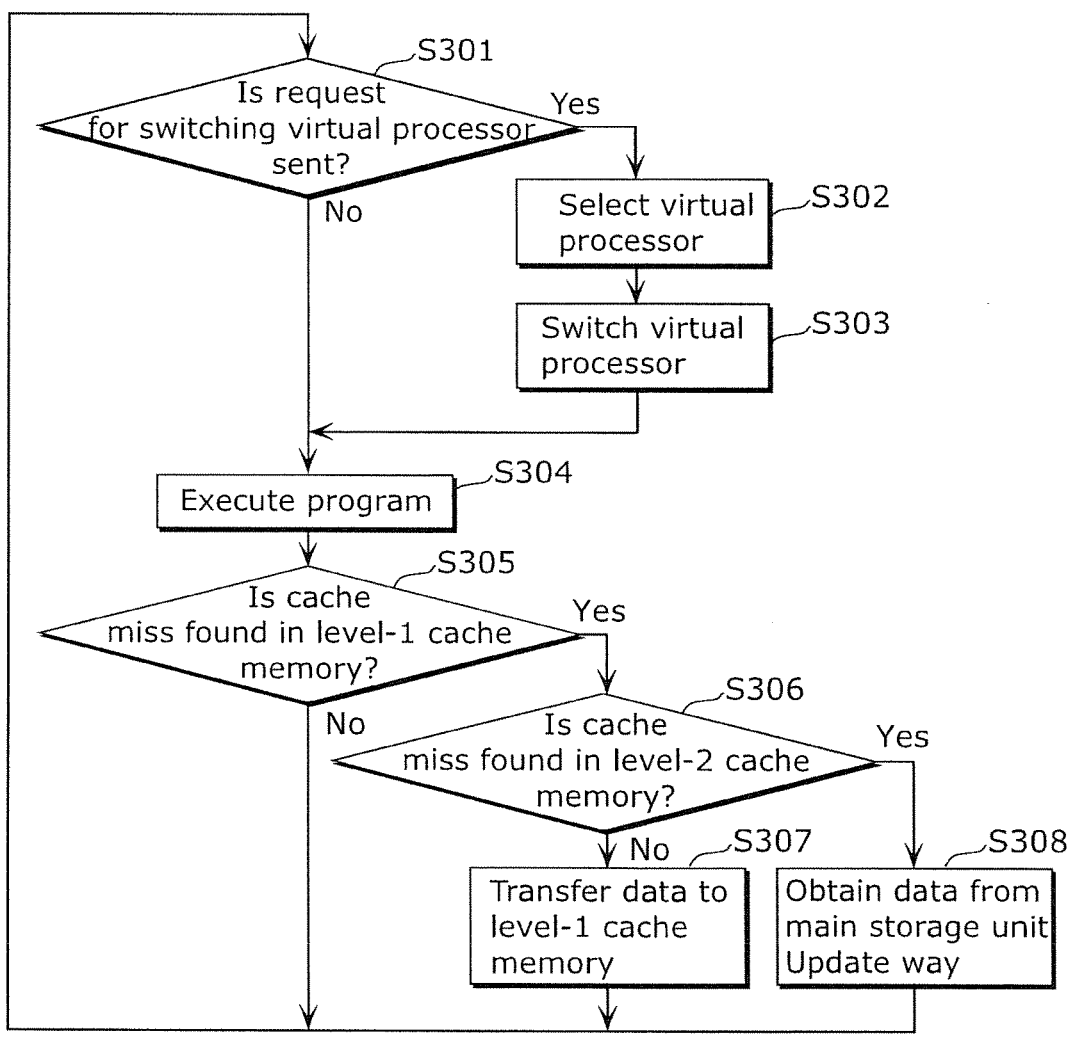
FIG. 3 depicts a flowchart for an operation of the computer system according to Embodiment 1.

(Step S602) in the execution of the programs (Step S602) carried out is the same processing as one from Steps S304 to S308 in FIG. 3. It is noted that in the case where the data of the request address from the level-1 cache control unit 412 is not found on a cache line in the level-2 cache memory 407, the level-2 cache control unit 406 transfers the data from the main storage unit 101 to the way (the way 407a), with reference to the cache assignment information 203. Furthermore, with reference to the processor ID, the level-2 cache control unit 406 simultaneously transfers the transferred data to the level-1 cache memory 413 as well. It is noted that the data is transferred to the way 0 because the virtual processor VP 0 is running. As a matter of course, the data is transferred to another way when another virtual processor VP is running.

The processor 404 executes the processing in Steps S611, S612, S620, and S621. The processing in Steps S611 and S612 is carried out on a different processor, and is the same as the processing in Steps S601 and S602.

As described above, in Embodiment 2, a cache memory placed near each of processor cores is shared among virtual processors VP in the case where multiple processors are provided. Then, for each of the virtual processors VP, assigned is one of storage areas (ways) included in a cache memory placed apart from the processor core. This feature contributes to reducing a switching loss which occurs when the virtual processors VP are switched. Furthermore, the feature makes it easy to implement performance designing for each virtual processor, while simplifying a circuit for the cache memory placed near the processor core. This facilitates the development of a faster processor. Moreover, this feature allows the cache memory near the processor core to be shared. Thus, the cache memory requires just a small capacity for caching, which contributes to decreasing chip costs.

In Embodiment 2, the number of processors in the computer system 400 shall not be limited.

In Embodiment 2, a cache memory near the processor core is shared and a cache memory apart from the processor core is partitioned. Embodiment 2 does not limit either the level of a shared memory level or the level of a partitioned memory level to a particular level. For example, a level-2 cache memory may be shared and a level-3 cache memory may be partitioned.

It is noted that, in Embodiment 2, the number of ways in the level-2 cache memory 407 shall not be limited, and the cache scheme shall not be limited to the N-way set associative.

It is noted that, in Embodiment 2, the level-2 cache memory 407 does not necessarily have to be partitioned for each way; instead, the level-2 cache memory 407 may be partitioned for each bundle of cache lines. How to bundle the cache lines shall not be limited in particular.

In Embodiment 2, there is no limit to the number of virtual processors VP held in the context memory 103.

In Embodiment 2, a virtual processor scheduling scheme may be a scheme other than the round robin and a scheme to select virtual processors-to-run based on priorities. Embodiment 2 does not limit the virtual processor scheduling scheme.

In Embodiment 2, a cache replacement algorithm may be the least recently used (LRU) algorithm or may be based on priorities and use frequency. Embodiment 2 does not limit the cache replacement algorithm.

In Embodiment 2, the cache assignment information 203 may be set either from software or hardware. Embodiment 2 does not limit how to set the cache assignment information 203.

Embodiment 3

Hereinafter described is a computer system according to Embodiment 3, with reference to the drawings. The computer system according to Embodiment 1 includes one processing executing unit in a processor. The computer system according to Embodiment 3 includes two or more thread executing units in a processor, and the processor includes two or more hardware threads, and is capable of multithreading.

Figure 7:
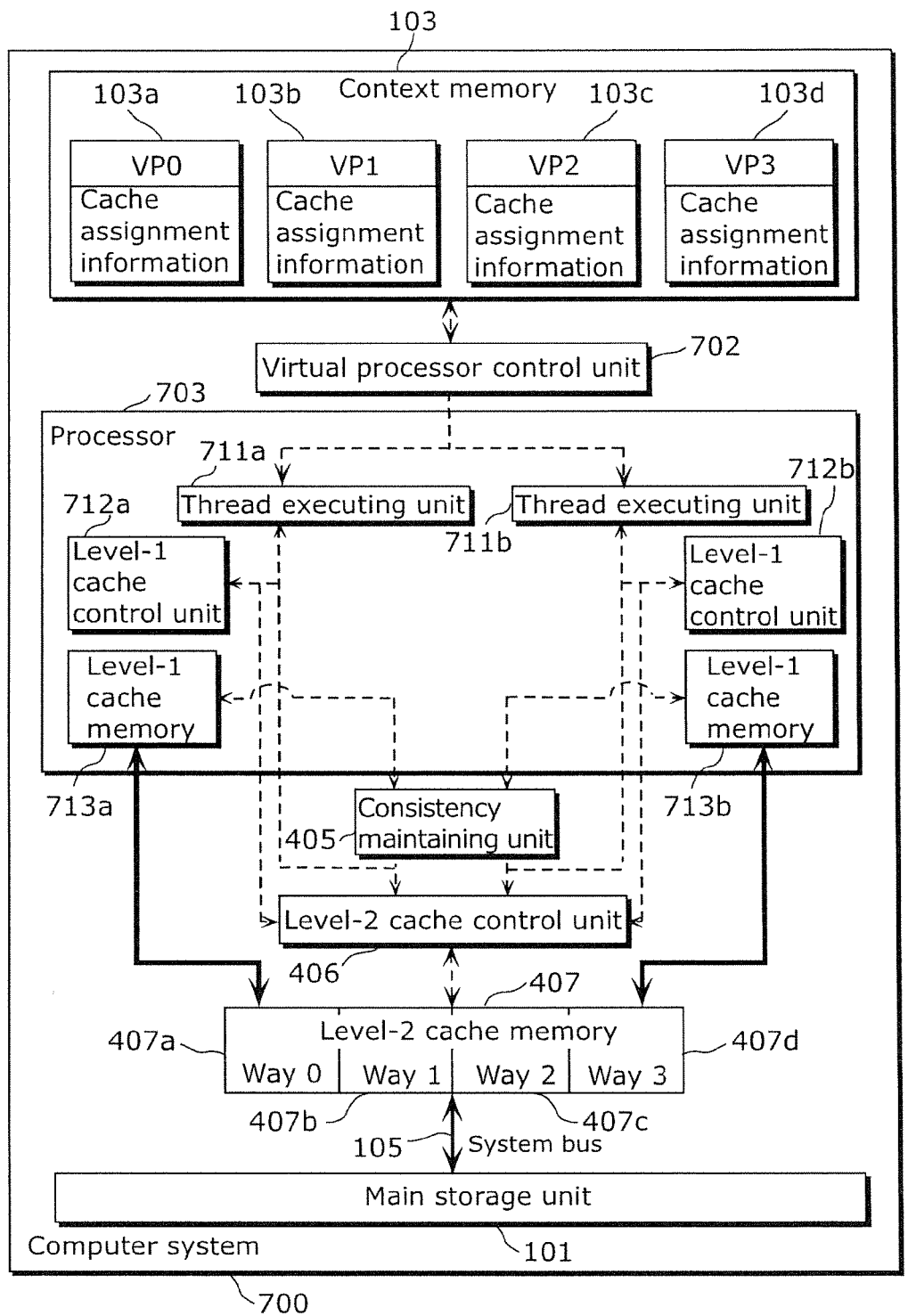
FIG. 7 depicts a block diagram showing a hardware structure of a computer system according to Embodiment 3.

FIG. 7 depicts a block diagram showing a hardware structure of a computer system according to Embodiment 3. A computer system 700 includes a processor 703, the context memory 103, a virtual processor control unit 702, the consistency maintaining unit 405, the level-2 cache control unit 406, the level-2 cache memory 407, and the main storage unit 101.

The processor 703 includes hardware threads and is capable of multithreading. For the sake of simplicity, two hardware threads are included in the processor 703. Hereinafter, each of the hardware threads is referred to as a thread executing unit 711a and a thread executing unit 711b.

It is noted that FIG. 7 shows an implementation of the present invention. Hence, the number of the hardware threads shall not be limited to two in the present invention. In the description below, constitutional elements which share the same numerical reference seen in FIG. 1 or FIG. 4 carry out a similar function. Thus, the details thereof shall be omitted.

The processor 703 includes the thread executing unit 711a, a level-1 cache control unit 712a, a level-1 cache memory 713a, the thread executing unit 711b, a level-1 cache control unit 712b, and a level-1 cache memory 713b. It is noted that a level-1 cache memory is provided for each of the hardware threads, and is shared among the virtual processors VP that run on the hardware thread.

The processor 703 is accessible to the main storage unit 101 through one of (i) either the level-1 cache memory 713a or the level-1 cache memory 713b and (ii) the level-2 cache memory 407. The processor 703 is also accessible to the main storage unit 101 without involving any of them. Since this memory access is not the main point of the present invention, an illustration of a connecting line between the main storage unit 101 and processor 703 shall be omitted in FIG. 7.

When the virtual processor control unit 702 sets to one of the thread executing units 711a and 711b context items for virtual processors VP to be executed, the thread executing units 711a or 711b sequentially executes the programs of the virtual processors VP. Furthermore, one of the thread executing units 711a and 711b sends, to the level-2 cache control unit 406, (i) the cache assignment information 203 included in the context item of a virtual processor VP and (ii) a thread ID for identifying whether the sending hardware thread is either the thread executing unit 711a or the thread executing unit 711b.

The level-1 cache control unit 712a checks whether or not data of a request address from the thread executing unit 711a is found on a cache line in the level-1 cache memory 713a.

The level-1 cache control unit 712b checks whether or not data of a request address from the thread executing unit 711b is found on a cache line in the level-1 cache memory 713b. In the case where there is no data of the request address in a level-1 cache memory used for each of the thread executing units, a cache miss develops. The level-1 cache control unit 712a or the level-1 cache control unit 712b notifies the level-2 cache control unit 406 of the request address.

The level-1 cache memory 713a or the level-1 cache memory 713b is a typical cache memory to be used for a processor. Each of the cache memories is shared among virtual processors VP which run on each of the threads.

The virtual processor control unit 702 switches the virtual processors VP whose processing is executed in each thread executing unit. First, the virtual processor control unit 702 writes, to an appropriate storage location in the context memory 103, a context item of a virtual processor VP executing processing in a thread executing unit to perform the switching. Next, the virtual processor control unit 702 selects a virtual processor VP to be executed next. Then, the virtual processor control unit 702 sets, to the thread executing unit on which the switching is performed, a context item held in the context memory 103 and designated to the selected virtual processor VP. The virtual processor control unit 702 executes such a sequence of operations to implement multiple virtual processors VP. It is noted that the virtual processors VP may be selected according to, for example, the round robin, or predetermined priorities of the virtual processors VP. The present invention shall not limit how to select the virtual processors VP. Moreover, each context item of a virtual processor VP may have additional designating information of a thread executing unit operating the virtual processor VP. Then, the virtual processor control unit 702 may select a virtual processor VP to run, with reference to the designating information.

Described next is an operation for switching the virtual processors VP in the computer system 700, with reference to the flowchart in FIG. 8. For the sake of simplicity, the computer system 700 utilizes the round robin to select the virtual processors VP. In other words, the virtual processors VP run in the order of VP 0, VP 1, VP 2, VP 3, and VP 0 (subsequently, the sequence repeats). Currently, the virtual processors VP 0 is set to the thread executing unit 711a, and the virtual processor VP 1 is set to the thread executing unit 711b. The switching operation is carried out when the virtual processors VP 0 spends an allowed time period and is switched.

(Step S801) First, the virtual processor control unit 702 determines whether or not the thread executing units 711a and 711b send a request for switching the virtual processors VP. In the case where the request for switching is sent, the sequence proceeds to Step S820. In the case where there is no request for switching, the sequence proceeds to Step S802.

(Step S820) The virtual processor control unit 702 selects the next virtual processor VP to execute processing. Here, suppose the virtual processor VP 2 (the context item 103c) is selected. It is noted that when requests for switching the virtual processors VP are sequentially sent from each of the thread executing units, the next virtual processor VP to execute processing is selected in the order of the thread executing units that have sent the requests. When the requests for switching the virtual processors VP are simultaneously sent from the thread executing units 711a and 711b, a priority is given to the thread executing unit 711a. In other words, the virtual processor control unit 702 first selects a virtual processor VP to run on the thread executing unit 711a, and then selects another virtual processor VP to run on thread executing unit 711b.

(Step S821) The virtual processor control unit 702 switches the virtual processors VP. In the above case, the thread executing unit 711a stops the execution of the virtual processor VP 0. Then, the virtual processor control unit 702 saves the context item of the virtual processor VP 0 on the context item 103a in the context memory 103, and sets, to the thread executing unit 711a processing executing unit 411, the context item 103c of the selected virtual processor VP 2.

(Step S802) The thread executing unit 711a sequentially executes programs according to the context items of the set virtual processors VP. Here, the thread executing unit 711a executes a program according to the context item of the virtual processor VP 2.

(Step S803) While the virtual processors VP are executing the programs, the level-1 cache control unit 712a determines whether or not data of the request address from the thread executing unit 711a is found on a cache line in the level-1 cache memory 713a. In the case where no such data is found, the level-1 cache control unit 712a determines that a cache miss has developed, and notifies the level-2 cache control unit 406 of the request address. Then, the sequence proceeds to Step S804. In the case where the data is found, the sequence proceeds to Step S801.

(Step S804) The level-2 cache control unit 406 determines whether or not the data of the request address from the level-1 cache control unit 712a is found on an appropriate cache line in the level-2 cache memory 407. Here, the level-2 cache control unit 406 also determines whether or not the data of the request address is found on a cache line of a way other than the way assigned to the virtual processor VP running in the thread executing unit 711a that has sent the request. In the case where the data of the request address is found on the cache lines in the level-2 cache memory 407, the sequence proceeds to Step S805. In the case where no such data is found, the sequence proceeds to Step S806.

(Step S805) Through the level-1 cache control unit 712a, the level-2 cache control unit 406 transfers, to a cache line of the level-1 cache memory 713a, the data on an appropriate cache line in the level-2 cache memory 407.

(Step S806) The level-2 cache control unit 406 refers to the cache assignment information 203. Here, suppose the case where a cache miss has developed when the virtual processor VP 2 is running in the thread executing unit 711a. The level-2 cache control unit 406 transfers the data from the main storage unit 101 to the way 2 (the way 407c) assigned to the virtual processor VP 2 and included in the level-2 cache memory 407. Moreover, the level-2 cache control unit 406 simultaneously transfers the transferred data to the level-1 cache memory 713a as well.

The thread executing unit 711b executes the processing in Steps S811 to S816, S820, and S821. The processing in Steps S811 to S816 is carried out on a different processor, and is the same as the processing in Steps S801 to S806.

As described above, in Embodiment 3, a cache memory placed near each of the processor cores is shared among virtual processors VP in the case where multiple hardware threads are provided in a processor capable of multithreading. Then, for each of the virtual processors VP, assigned is one of storage areas (ways) included in a cache memory placed apart from the processor core. This feature contributes to reducing a switching loss which occurs when the virtual processors VP are switched. Furthermore, the feature makes it easy to implement performance designing for each virtual processor, while simplifying a circuit for the cache memory placed near the processor core. This facilitates the development of a faster processor. Moreover, this feature allows the cache memory near the processor core to be shared. Thus, the cache memory requires just a small capacity for caching, which contributes to decreasing chip costs.

In Embodiment 3, the number of hardware threads in the computer system 700 shall not be limited.

In Embodiment 3, a cache memory near the processor core is shared and a cache memory apart from the processor core is partitioned. Embodiment 3 does not limit either the level of a shared memory or the level of partitioned memory to a particular level. For example, a level-2 cache memory may be shared and a level-3 cache memory may be partitioned.

It is noted that, in Embodiment 3, the number of ways in the level-2 cache memory 407 shall not be limited, and the cache scheme shall not be limited to the N-way set associative.

It is noted that, in Embodiment 3, the level-2 cache memory 407 does not necessarily have to be partitioned for each way; instead, the level-2 cache memory 407 may be partitioned for each bundle of cache lines. How to bundle the cache lines shall not be limited in particular.

In Embodiment 3, there is no limit to the number of virtual processors held in the context memory 103.

In Embodiment 3, a virtual processor scheduling scheme may be a scheme other than the round robin and a scheme to select virtual processors-to-run based on priorities. Embodiment 3 does not limit the virtual processor scheduling scheme.

In Embodiment 3, a cache replacement algorithm may be the least recently used (LRU) algorithm or may be based on priorities and use frequency. Embodiment 3 does not limit the cache replacement algorithm.

In Embodiment 3, the cache assignment information 203 may be set either from software or hardware. Embodiment 3 does not limit how to set the cache assignment information 203.

Embodiment 4

Hereinafter described is a computer system according to Embodiment 4, with reference to the drawings. The computer system according to Embodiment 3 includes one processor including multiple thread executing units. Instead, the computer system according to Embodiment 4 includes two processors each having multiple thread executing units.

Figure 9:
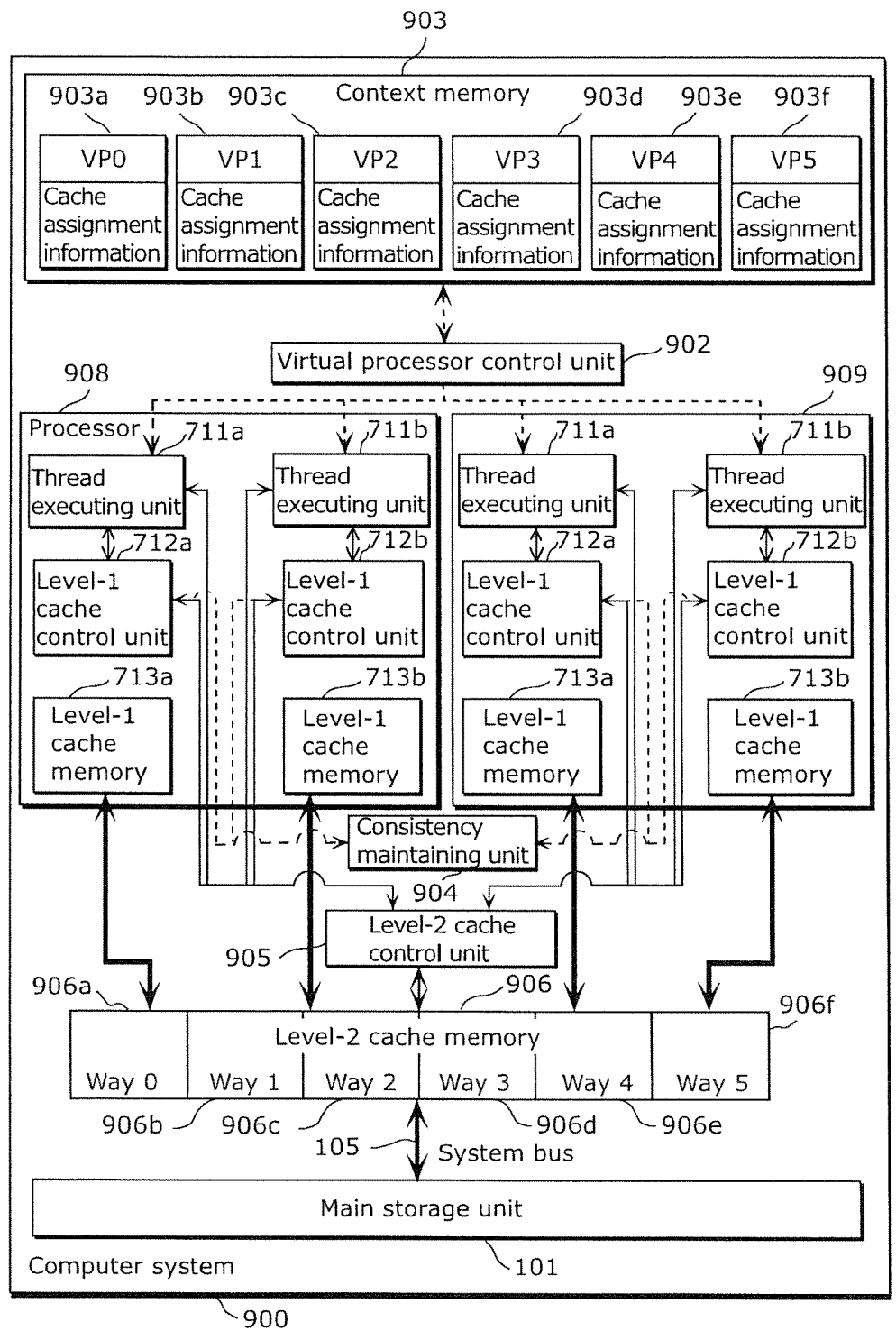
FIG. 9 depicts a block diagram showing a hardware structure of a computer system according to Embodiment 4.

FIG. 9 depicts a block diagram showing a hardware structure of a computer system according to Embodiment 4. In the description below, constitutional elements which share the same numerical reference seen in FIG. 1 or FIG. 7 carry out a similar function. Thus, the details thereof shall be omitted.

A computer system 900 includes processors 908 and 909 each of which includes hardware threads and is capable of multithreading, a context memory 903, a virtual processor control unit 902, a consistency maintaining unit 904, a level-2 cache control unit 905, a level-2 cache memory 906, and the main storage unit 101. It is noted that FIG. 9 shows an implementation of the present invention. Hence, the number of the hardware threads in each of the processors shall not be limited to two in the present invention. In the description below, constitutional elements which share the same numerical reference seen in FIG. 1 or FIG. 7 carry out a similar function. Thus, the details thereof shall be omitted.

The main storage unit 101 is connected to the processors 908 and 909 through a system bus 105 and the level-2 cache memory 906. In response to a request from one of the processors 908 and 909, the main storage unit 101 reads the data held in the main storage unit 101 itself, and transfers the data to the level-2 cache memory 906. In response to a request from one of the processors 908 and 909, writing to the main storage unit 101 is carried out in a similar manner.

The context memory 903 holds the same information items as the context memory 103 holds, for as many as the virtual processors VP. The only difference between the context memories 903 and 103 is the number of virtual processors VP to be held. In the Embodiment 4, six virtual processors VP are held.

Each of the processors 908 and 909 has the same structure as the processor 703 has. It is noted that each of the level-1 cache memories is provided per hardware thread, and shared among the virtual processors VP running on the hardware thread. In the processor 908, specifically, the thread executing unit 711*a* uses the level-1 cache memory 713*a*, and the thread executing unit 711*b* uses the level-1 cache memory 713*b*. In the processor 909, specifically, the thread executing unit 711*a* uses the level-1 cache memory 713*a*, and the thread executing unit 711*b* uses the level-1 cache memory 713*b*. The functions and operations of the processors 908 and 909 are similar to those of the processor 703 in Embodiment 3. Thus, the details thereof shall be omitted. Each of the processors 908 and 909 is accessible to the main storage unit 101 through one of (i) either the level-1 cache memory 713*a* or the level-1 cache memory 713*b* and (ii) the level-2 cache memory 906. Each of the processors 908 and 909 is also accessible to the main storage unit 101 without involving any of them. Since this is not the main point of the present invention, an illustration of a connecting line between (i) either the processor 908 or the processor 909 and (ii) the main storage unit 101 shall be omitted in FIG. 9.

The virtual processor control unit 902 switches the virtual processors VP executing processing in each thread executing unit. First, the virtual processor control unit 902 writes, to an appropriate storage location in the context memory 903, a context item of a virtual processor VP executing processing in a thread executing unit on which the switching is to be carried out. Next, the virtual processor control unit 902 selects a virtual processor VP to be executed next. Then, the virtual processor control unit 902 sets, to a thread executing unit on which the switching is performed, a context item (one of the context items 903*a*, 903*b*, 903*c*, 904*d*, 904*e*, and 904*f*) held in the context memory 903 and designated to the selected virtual processor VP. The virtual processor control unit 902 executes such a sequence of operations to implement multiple virtual processors VP. It is noted that the virtual processors VP may be selected according to, for example, the round robin, or predetermined priorities of the virtual processors VP.

Using a known technique, the consistency maintaining unit 904 secures the consistency of data shared between the processors 908 and 909 and between data shared among threads in each processor, so that the consistency maintaining unit 904 prevents inconsistency between the level-1 cache memories.

The level-2 cache control unit 905 receives the cache assignment information 203 from each of the thread executing units. In the case of receiving a request address from one of (i) either the level-1 cache control unit 712*a* or the level-1 cache control unit 712*b* in processor 908 and (ii) either the level-1 cache control unit 712*a* or the level-1 cache control unit 712*b* in processor 909, the level-2 cache control unit 905 checks whether or not the data of the request address is found on a cache line in the level-2 cache memory 906. In the case where the data of the request address is not found, the level-2 cache control unit 905 refers to the cache assignment information 203 and caches the data of the request address in a target way included in the level-2 cache memory 906. In the case where the data of the request address is found, the level-2 cache control unit 905 detects the thread ID, and caches the data of the request address on a cache line in the target level-1 cache memory.

The level-2 cache memory 906 is a 6-way set associative. The level-2 cache memory 906 is partitioned for each way. For each way, a virtual processor VP is designated. Here, a way 0 (a way 906*a*) is assigned to the virtual processor VP 0 (the context item 903*a*). A way 1 (a way 906*b*) is assigned to the virtual processor VP 1 (the context item 903*b*). A way 2 (a way 906*c*) is assigned to the virtual processor VP 2 (the context 903*c*). A way 3 (a way 906*d*) is assigned to the virtual processor VP 3 (the context item 903*d*). A way 4 (a way 906*e*) is assigned to the virtual processor VP 4 (the context item 903*e*). A way 5 (a way 906*f*) is assigned to the virtual processor VP 5 (the context item 903*f*). When receiving read requests or write requests from the level-1 cache control unit for each of the thread executing units, the level-2 cache memory 906 reads or writes the data according to the order of reception of the requests. When simultaneously receiving the requests from multiple level-1 cache control unit, the level-2 cache memory 906 reads or writes the data according to predetermined priorities of the level-1 cache control units. For example, suppose the level-1 cache control units 712*a* and 712*b* in the processor 908 have the first and second priorities, respectively. The level-1 cache control units 712*a* and 712*b* in the processor 909 have the third and fourth priorities, respectively. In addition, suppose the level-2 cache memory 906 processes the requests of the level-1 cache control units in ascending order of priorities. It is noted that in Embodiment 2, a virtual processor is assigned for each way. Instead, a virtual processor VP may be assigned for each of cache lines in the level-2 cache memory 906 (See Cited Reference 1) and information indicating a correspondence relationship between the cache lines and the virtual processors VP may be used as the cache assignment information 203. Here, the cache assignment information 203 may designate, from software for each virtual processor VP, one of (i) areas (ii) positions and the number of the ways and (iii) positions and the number of the cache lines. Here, the areas, the ways, and the cache lines are included in the level-2 cache memory 906 and assigned to the corresponding virtual processors VP. As a matter of course, such designation allows more flexible control of the computer system 900.

Described next is how the computer system 900 operates, with reference to the flowchart in FIG. 10. For the sake of simplicity, the computer system 900 utilizes the round robin to select the virtual processors VP. The virtual processors VP run in the order of VP 0, VP 1, VP 2, VP 3, VP 4, VP5, and VP 0 (subsequently, the sequence repeats). In activation, the virtual processors are set to the thread executing units as follows: In the processor 908, the virtual processor VP 0 is set to the thread executing unit 711*a*, and the virtual processor VP 1 is set to the thread executing unit 711*b*; and in the processor 909, the virtual processor VP 2 is set to the thread executing unit 711*a*, and the virtual processor VP 3 is set to the thread executing unit 711*b*.

It is noted that in the description of the flowchart below, the operations of the processors 908 and 909 are similar to that of the processor 703. Thus, described here is the difference between the computer systems 900 and 700.

Figure 10:
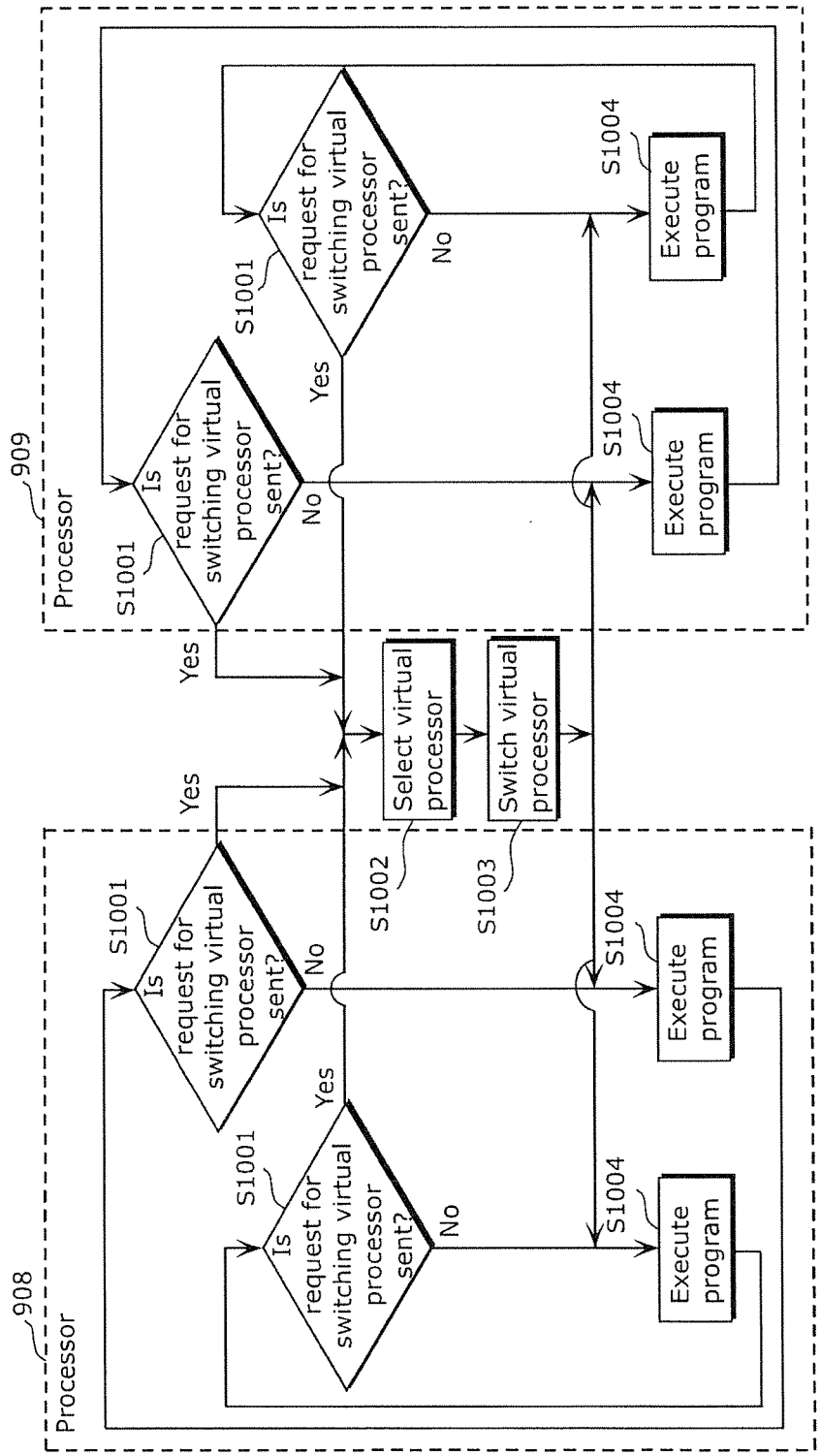
FIG. 10 depicts a flowchart for an operation of the computer system according to Embodiment 4.

FIG. 10 shows four groups of processing, Steps S1001 to S1004. In other words, there are flows for four types of processing. A flow for each type of processing corresponds to a flow for processing carried out by a corresponding group of a thread executing unit, a level-1 cache control unit and a level-1 cache memory.

(Step S1001) The virtual processor control unit 902 determines whether or not each of the thread executing units in the processors 908 and 909 sends a request for switching the virtual processors. In the case where the request for switching is sent, the sequence proceeds to Step S1002. In the case where there is no request for switching, the sequence proceeds to Step S1004.

(Step S1002) The virtual processor control unit 902 selects the next virtual processor VP to execute processing. Here, suppose the virtual processor VP 4 (the context item 903*e*) is selected. It is noted that when requests for switching the virtual processors VP are sequentially sent from each of the thread executing units, the next virtual processor VP to execute processing is selected in the order of the processors that have sent the requests. When the requests for switching the virtual processors VP are simultaneously sent from multiple thread executing units, the next virtual processor VP to execute processing is selected according to predetermined priorities of the thread executing units. For example, the thread executing unit 711*a* and the thread executing unit 711*b* in the processor 908 have the first and second priorities, respectively. The thread executing unit 711*a* and the thread executing unit 711*b* in the processor 909 have the third and fourth priorities, respectively. When the virtual processors VP are switched, the requests for switching are prioritized according to the ascending order of the priorities of the thread executing units.

Figure 8:
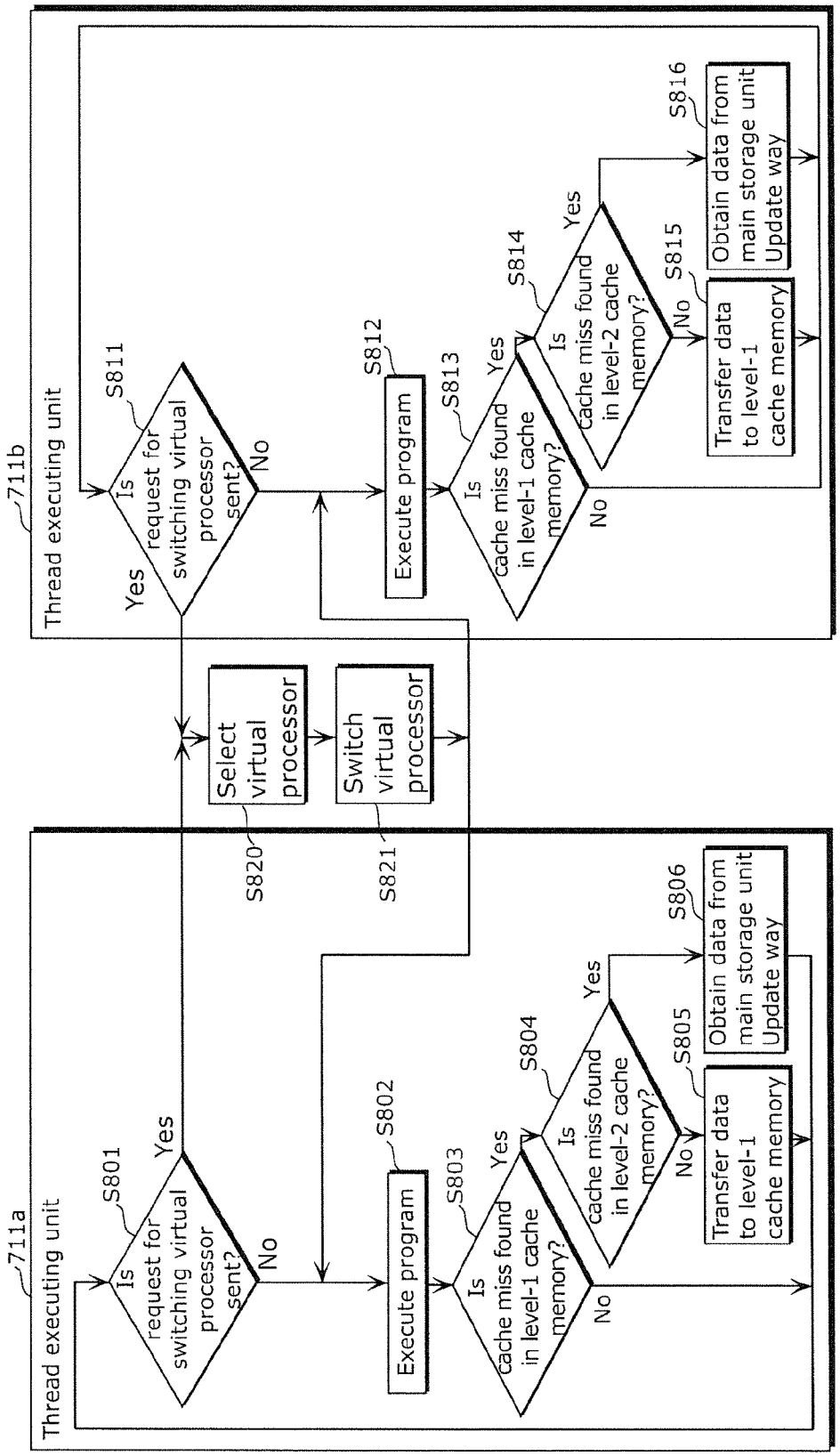
FIG. 8 depicts a flowchart for an operation of the computer system according to Embodiment 3.

(Step S1003) The operation is the same as that in Step S821 in FIG. 8.

(Step S1004) Programs are executed. In the execution of the programs (Step S1004), carried out is the same processing as one from Steps S802 to S806 in FIG. 8.

As described above, in Embodiment 4, a cache memory placed near each of the processor cores is shared among virtual processors VP in the case where there are multiple processors capable of multithreading and each of the processors includes multiple hardware threads. For each of the virtual processors VP, assigned is one of storage areas (ways) included in a cache memory placed apart from each of the processor cores. This feature contributes to reducing a switching loss which occurs when the virtual processors VP are switched. Furthermore, the feature makes it easy to implement performance designing for each virtual processor, while simplifying a circuit for the cache memory placed near the processor core. This facilitates the development of a faster processor. Moreover, this feature allows the cache memory near the processor core to be shared. Thus, the cache memory requires just a small capacity for caching, which contributes to decreasing chip costs.

In Embodiment 4, the number of the processors capable of multithreading and the number of hardware threads in the computer system 900 shall not be limited.

In Embodiment 4, a cache memory near the processor core is shared and a cache memory apart from the processor core is partitioned. Embodiment 4 does not limit either the level of a shared memory or the level of partitioned memory to a particular level. For example, a level-2 cache memory may be shared and a level-3 cache memory may be partitioned.

It is noted that, in Embodiment 4, the number of ways in the level-2 cache memory 906 shall not be limited, and the cache scheme shall not be limited to the N-way set associative.

It is noted that, in Embodiment 4, the level-2 cache memory 906 does not necessarily have to be partitioned for each way; instead, the level-2 cache memory 906 may be partitioned for each bundle of cache lines. How to bundle the cache lines shall not be limited in particular.

In Embodiment 4, there is no limit to the number of virtual processors held in the context memory 903.

In Embodiment 4, a virtual processor scheduling scheme may be a scheme other than the round robin and a scheme to select virtual processors-to-run based on priorities. Embodiment 4 does not limit the virtual processor scheduling scheme.

In Embodiment 4, a cache replacement algorithm may be the least recently used (LRU) algorithm or may be based on priorities and use frequency. Embodiment 4 does not limit the cache replacement algorithm.

In Embodiment 4, the cache assignment information 203 may be set either from software or hardware. Embodiment 4 does not limit how to set the cache assignment information 203.

Embodiment 5

Hereinafter described is a computer system according to Embodiment 5, with reference to the drawings. In the computer system according to Embodiment 4, a context memory is shared among the processors, and on each of the processors, a single type of virtual processor VP executes the processing. In contrast, the computer system according to Embodiment 5 includes a context memory for each processor, and a different type of virtual processor VP for each of the processors executes the processing on the processor.

Figure 11:
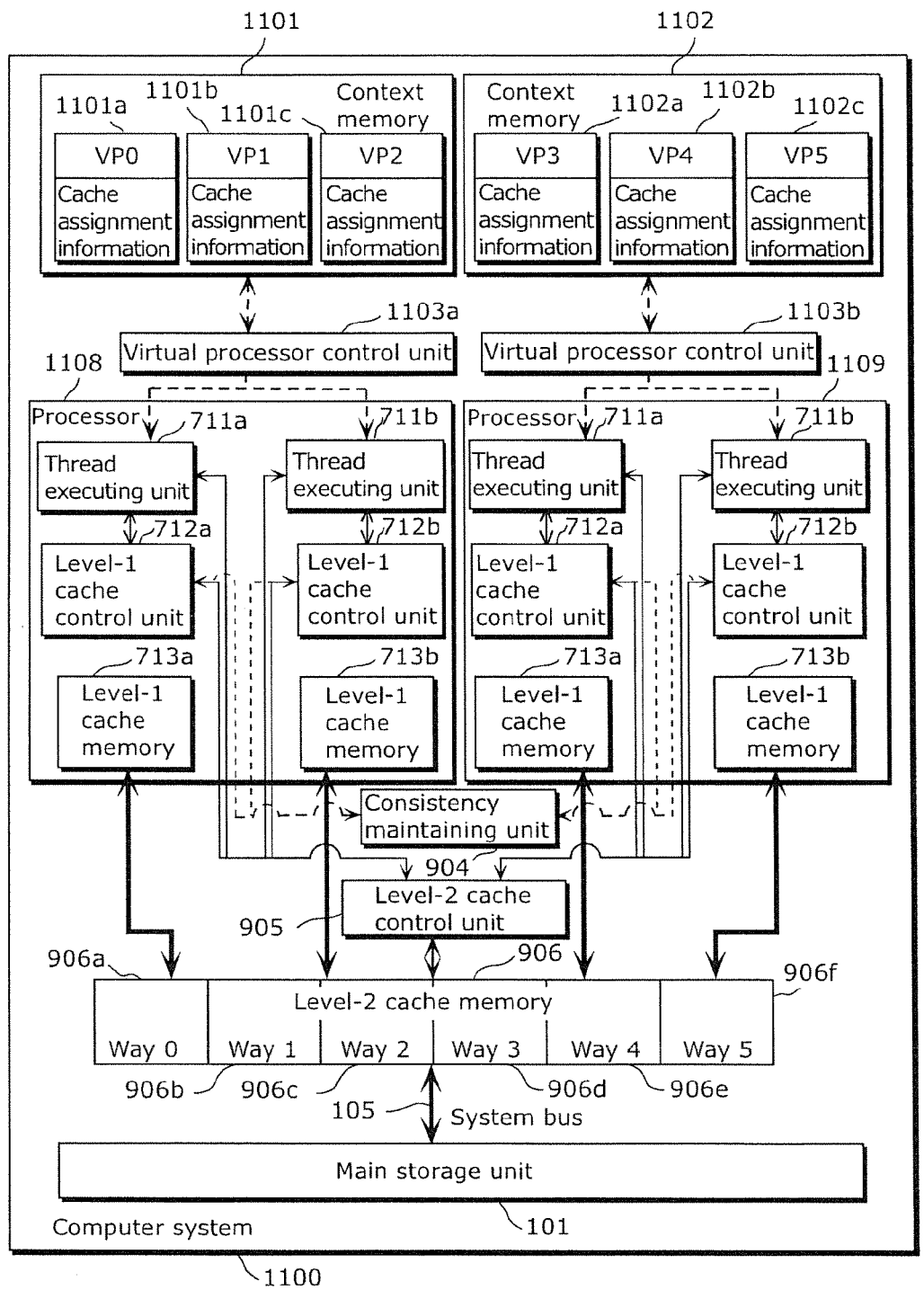
FIG. 11 depicts a block diagram showing a hardware structure of a computer system according to Embodiment 5.

FIG. 11 depicts a block diagram showing a hardware structure of the computer system according to Embodiment 5. In the description below, constitutional elements which share the same numerical reference seen in FIG. 1, FIG. 7, or FIG. 9 carry out a similar function. Thus, the details thereof shall be omitted.

A computer system 1100 includes processors 1108 and 1109 each of which includes hardware threads and is capable of multithreading, context memories 1101 and 1102, virtual processor control units 1103*a* and 1103*b*, the consistency maintaining unit 904, the level-2 cache control unit 905, the level-2 cache memory 906, and the main storage unit 101. It is noted that FIG. 11 shows an implementation of the present invention. Hence, the number of the hardware threads in each of the processors shall not be limited to two in the present invention. Nor the number of processor shall be limited to two. Each of the processors 1108 and 1109 is accessible to the main storage unit 101 through one of (i) either the level-1 cache memory 713*a* or the level-1 cache memory 713*b* and (ii) the level-2 cache memory 906. Each of the processors 1108 and 1109 is also accessible to the main storage unit 101 without involving any of them. Since this memory access is not the main point of the present invention, an illustration of a connecting line between the main storage unit 101 and the processor 1108 or the processor 1109 shall be omitted in FIG. 11. In the description below, constitutional elements which share the same numerical reference seen in FIG. 1, FIG. 7, or FIG. 9 carry out a similar function. Thus, the details thereof shall be omitted.

The context memory 1101 and 1102 hold the same information items as the context memory 903 holds, for as many as the virtual processors VP. The only difference between the context memories 1101 and 1102 and the context memory 903 is the number of virtual processors VP to be held. It is noted that the number of context items in a virtual processor VP shall not be limited. The context memory 1101 holds the context items of the virtual processors VP 0 to VP 2. The context memory 1102 holds the context items of the virtual processors VP 3 to VP5.

The virtual processor control unit 1103*a* switches the virtual processors VP executing processing in each of thread executing units in the processor 1108. The virtual processor control unit 1103*b* switches the virtual processors VP whose executing processing in each of thread executing units in the processor 1109. In writing, the virtual processor control unit 1103*a* writes, to an appropriate storage location in the context memory 1101, a context item of a virtual processor VP running on the processor 1108. Next, the virtual processor control unit 1103*a* selects a virtual processor VP to be executed next. Then, the virtual processor control unit 1103*a* sets, to a thread executing unit on which the switching is performed, a context item (one of context items 1101*a*, 1101*b*, and 1101*c*) held in the context memory 1101 and designated to a selected virtual processor VP. The virtual processor control unit 1103*a* executes such a sequence of operations to implement multiple virtual processors VP. The virtual processor control unit 1103*b* writes, to an appropriate storage location in the context memory 1102, a context item of a virtual processor VP running on the processor 1109 in writing. Next, the virtual processor control unit 1103*b* selects a virtual processor VP to be executed next. Then, the virtual processor control unit 1103*b* sets, to a thread executing unit on which the switching is performed, a context item (one of context items 1102*a*, 1102*b*, and 1102*c*) held in the context memory 1102 and designated to a selected virtual processor VP. The virtual processor control unit 1103*b* executes such a sequence of operations to implement multiple virtual processors VP. It is noted that the virtual processors VP may be selected according to, for example, the round robin, or predetermined priorities of the virtual processors VP.

Described next is how the computer system 1100 operates, with reference to the flowchart in FIG. 12. For the sake of simplicity, the computer system 1100 utilizes the round robin to select the virtual processors VP. The virtual processors VP, of which context items are held in the context memory 1101, run in the order of VP 0, VP 1, and VP 2 (subsequently, the sequence repeats). The virtual processors VP, of which context items are held in the context memory 1102, run in the order of VP 3, VP 4, and VP 5 (subsequently, the sequence repeats). In activation, the virtual processors are set to the thread executing units as follows: In the processor 1108, the virtual processor VP 0 (the context item 1101*a*) is set to the thread executing unit 711*a*, and the virtual processor VP 1 (the context item 1101*b*) is set to the thread executing unit 711*b*; and in the processor 1109, the virtual processor VP 3 (the context item 1102*a*) is set to the thread executing unit 711*a*, and the virtual processor VP 4 (the context item 1102*b*) is set to the thread executing unit 711*b*.

It is noted that in the description of the flowchart below, the operations of the processors 1108 and 1109 are similar to that of the processor 703.

Figure 12:
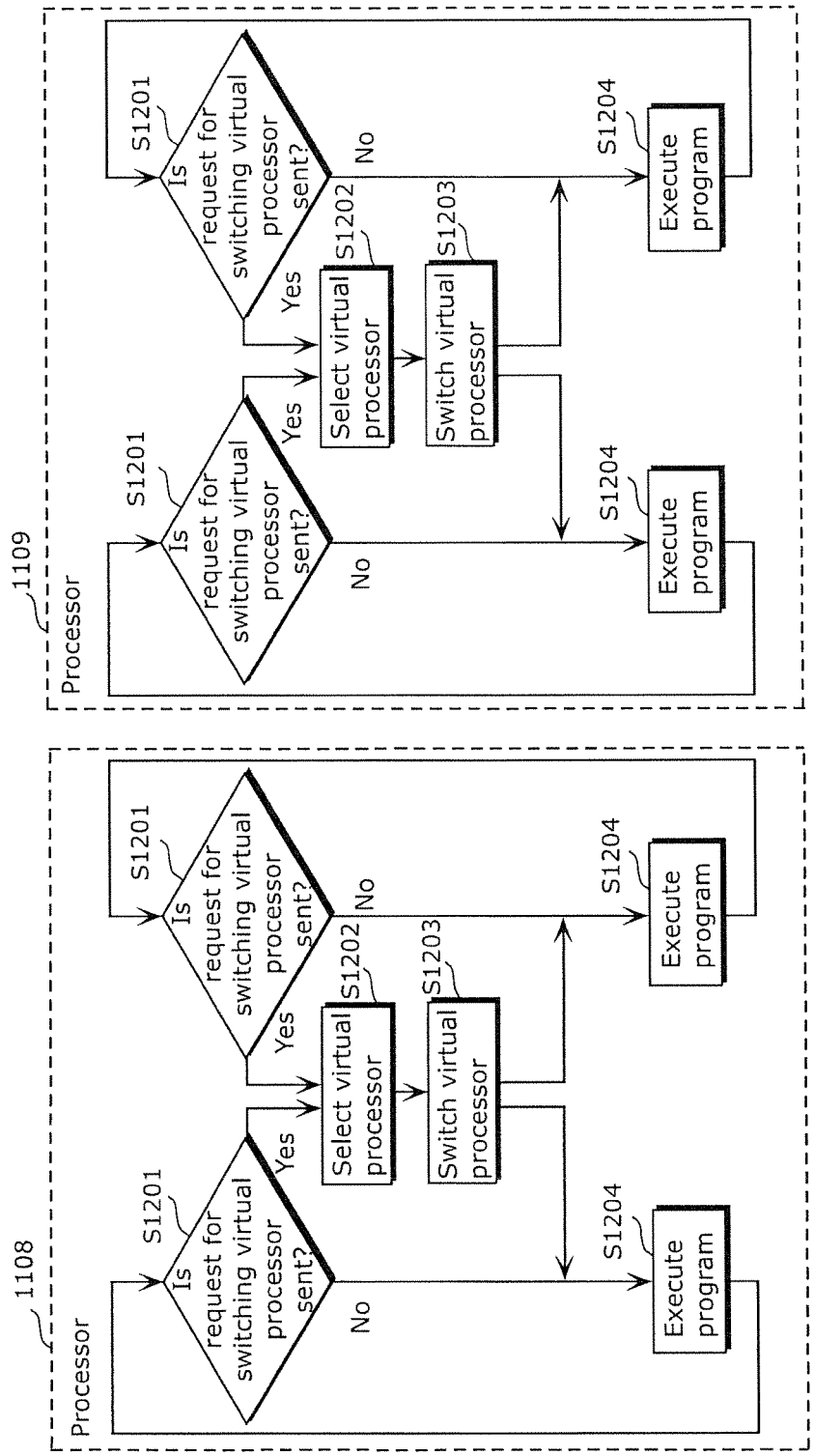
FIG. 12 depicts a flowchart for an operation of the computer system according to Embodiment 5.

FIG. 12 shows four groups of processing, Steps S1201 to S1204. In other words, there are flows for four types of processing. A flow for each type of processing corresponds to a flow of processing carried out by a corresponding group of a thread executing unit, a level-1 cache control unit and a level-1 cache memory.

In Embodiment 5, a context memory and a group of virtual processors VP are assigned to each of the processors. In the description for the flowchart in FIG. 12, the processing executed by the processor 1108 is shown. The description of the processing executed by the processor 1109 is the same as the description of the processing executed by the processor 1108.

(Step S1201) The operation is the same as that in Step S801 in FIG. 8.

(Step S1202) The operation is the same as that in Step S820 in FIG. 8.

(Step S1203) The operation is the same as that in Step S821 in FIG. 8.

(Step S1204) Programs are executed. In the execution of the programs (Step S1204), carried out is the same processing as one from Steps S802 to S806 in FIG. 8.

In Embodiment 5 described above, multiple (two or more) processors capable of multithreading are provided and each of the processors includes multiple (two or more) hardware threads. In such a structure, a cache memory placed near each of the processor cores is shared among virtual processors VP. For each of the virtual processors VP, assigned is one of storage areas (ways) included in a cache memory placed apart from each of the processor cores. This feature contributes to reducing a switching loss which occurs when the virtual processors VP are switched. Furthermore, the feature makes it easy to implement performance designing for each virtual processor, while simplifying a circuit for the cache memory placed near the processor core. This facilitates the development of a faster processor. Moreover, this feature allows the cache memory near the processor core to be shared. Thus, the cache memory requires just a small capacity for caching, which contributes to decreasing chip costs.

In Embodiment 5, the number of the processors capable of multithreading and the number of hardware threads in the computer system 1100 shall not be limited.

In Embodiment 5, a cache memory near the processor core is shared and a cache memory apart from the processor core is partitioned. Embodiment 5 does not limit either the level of a shared memory or the level of partitioned memory to a particular level. For example, a level-2 cache memory may be shared and a level-3 cache memory may be partitioned.

It is noted that, in Embodiment 5, the number of ways in the level-2 cache memory 906 shall not be limited, and the cache scheme shall not be limited to the N-way set associative.

It is noted that, in Embodiment 5, the level-2 cache memory 906 does not necessarily have to be partitioned for each way; instead, the level-2 cache memory 906 may be partitioned for each bundle of cache lines. How to bundle the cache lines shall not be limited in particular.

In Embodiment 5, there is no limit to the number of virtual processors held in the context memories 1101 and 1102.

In Embodiment 5, a virtual processor scheduling scheme may be a scheme other than the round robin and a scheme to select virtual processors-to-run based on priorities. Embodiment 5 does not limit the virtual processor scheduling scheme.

In Embodiment 5, a cache replacement algorithm may be the least recently used (LRU) algorithm or may be based on priorities and use frequency. Embodiment 5 does not limit the cache replacement algorithm.

In Embodiment 5, the cache assignment information 203 may be set either from software or hardware. Embodiment 5 does not limit how to set the cache assignment information 203.

Furthermore, the above embodiments may be combined.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is useful for a computer system including multi-level cache memories when the computer system operates on (i) a virtual multiprocessor in which virtual processors run on time-sharing and (ii) a processor including hardware threads and is capable of multithreading. Thus, the present invention contributes to achieving a faster computer system including various functions and easier independent performance designing for each of the functions.

The invention claimed is:

1. A computer system comprising:
a main storage unit configured to hold data;
a first processing executing unit provided in a first processor capable of virtual multiprocessing, and configured to sequentially execute processing to be executed on virtual processors;
a first shared cache memory which is provided in the first processor and shared among the virtual processors, and which holds data to be used by the virtual processors;
a partitioned cache memory which is provided on a storage level, outside the first processor, farther from the first processing execution unit than the first shared cache memory, and which includes storage areas that are partitioned based on the number of the virtual processors, the storage areas each (i) corresponding to one of the virtual processors and (ii) holding the data to be used by the corresponding one of the virtual processors;
a first context memory which holds, for each of the virtual processors, a context item corresponding to the virtual processor;
a virtual processor control unit configured to, according to a request for switching of the virtual processors that execute processing in the first processing executing unit, (i) save on the first context memory a context item of one of the virtual processors executing processing in the first processing executing unit and (ii) set, to the first processing executing unit, a context item held in the first context memory and designated to another one of the virtual processors to execute processing next in the first processing executing unit;
a first shared cache control unit configured to, in the case where a cache miss occurs in the first shared cache memory, perform control for (i) reading missing data from the partitioned cache memory and (ii) writing the read missing data to the first shared cache memory; and
a partitioned cache control unit configured to, in the case where a cache miss occurs in the partitioned cache memory, perform control for (i) reading missing data from the main storage unit and (ii) writing the read missing data to one of the storage areas which corresponds to one of the virtual processors executing processing in the first processing executing unit.

2. The computer system according to claim 1, further comprising:
a second processing executing unit provided in a second processor capable of virtual multiprocessing, and configured to sequentially execute processing to be executed on the virtual processors, the second processor being different from the first processor;
a second shared cache memory which is provided in the second processor and shared among the virtual processors that execute processing in the second processing executing unit, which holds data to be used by the virtual processors, and which is provided on a storage level higher than the partitioned cache memory, the partitioned cache memory being located outside the second processor;
a second shared cache control unit configured to, in the case where a cache miss occurs in the second shared cache memory, perform control for (i) reading missing data from the partitioned cache memory and (ii) writing the read missing data to the second shared cache memory; and a consistency maintaining unit configured to execute processing for maintaining consistency between the data held in the first shared cache memory and the data held in the second shared cache memory, wherein the virtual processor control unit is further configured to, according to a request for switching of the virtual processors that execute processing in the second processing executing unit, (i) save on the first context memory a context item of one of the virtual processors executing processing in the second processing executing unit and (ii) set, to the second processing executing unit, a context item held in the first context memory and designated to another one of the virtual processors to execute processing next in the second processing executing unit, and the partitioned cache control unit is configured to, in the case where a cache miss occurs in the partitioned cache memory, perform control for (i) reading missing data from the main storage unit and (ii) writing the read missing data to one of the storage areas corresponding to one of the virtual processors executing processing in either the first processing executing unit or the second processing executing unit.

3. The computer system according to claim 1, wherein the context item includes cache assignment information indicating one of the storage areas which is (i) included in the partitioned cache memory and (ii) associated with one of the virtual processors which corresponds to the context item, and the partitioned cache control unit is configured to, in the case where a cache miss occurs in the partitioned cache memory, perform control for (i) reading missing data from the main storage unit and (ii) writing the read missing data to one of the storage areas corresponding to one of the virtual processors which causes the cache miss and is found when the partitioned cache control unit refers to the context items held in the first context memory.

4. The computer system according to claim 1, wherein the first shared cache memory is a level-1 cache memory, and the partitioned cache memory is a level-2 cache memory.

5. The computer system according to claim 1, wherein the first shared cache memory is a level-2 cache memory, and the partitioned cache memory is a level-3 cache memory.

6. The computer system according to claim 1, wherein the first processor includes hardware threads and is capable of multithreading, the first processing executing unit is configured to execute threads using hardware, the computer system further comprises:

a second processing executing unit provided in the first processor, and configured to execute threads using hardware and to sequentially execute processing to be executed on the virtual processors;

a second shared cache memory which is provided in the first processor and shared among the virtual processors that execute processing in the second processing executing unit, which holds data to be used by the virtual processors, and which is provided on a storage level higher than the partitioned cache memory;

a second shared cache control unit configured to, in the case where a cache miss occurs in the second shared cache memory, perform control for (i) reading missing data from the partitioned cache memory and (ii) writing the read missing data to the second shared cache memory; and a consistency maintaining unit configured to execute processing for maintaining consistency between the data held in the first shared cache memory and the data held in the second shared cache memory, wherein the virtual processor control unit is further configured to, according to a request for switching of the virtual processors that execute processing in the second processing executing unit, (i) save on the first context memory a context item of one of the virtual processors executing processing in the second processing executing unit and (ii) set, to the second processing executing unit, a context item held in the first context memory and designated to another one of the virtual processors to execute processing next in the second processing executing unit, and the partitioned cache control unit is configured to, in the case where a cache miss occurs in the partitioned cache memory, perform control for (i) reading missing data from the main storage unit and (ii) writing the read missing data to one of the storage areas corresponding to one of the virtual processors executing processing in either the first processing executing unit or the second processing executing unit.

7. The computer system according to claim 6, further comprising:

a third processing executing unit and a fourth processing executing unit each provided in a second processor including hardware threads and is capable of multithreading, and configured to execute threads using hardware and to sequentially execute processing to be executed on the virtual processors, the second processor being different from the first processor;

a third shared cache memory which is provided in the second processor and shared among the virtual processors that execute processing in the third processing executing unit, which holds data to be used by the virtual processors, and which is provided on a storage level higher than the partitioned cache memory;

a third shared cache control unit configured to, in the case where a cache miss occurs in the third shared cache memory, perform control for (i) reading missing data from the partitioned cache memory and (ii) writing the read missing data to the third shared cache memory;

a fourth shared cache memory which is provided in the second processor and shared among the virtual processors that execute processing in the fourth processing executing unit, which holds data to be used by the virtual processors, and which is provided on a storage level higher than the partitioned cache memory; and a fourth shared cache control unit configured to, in the case where a cache miss occurs in the fourth shared cache memory, perform control for (i) reading missing data from the partitioned cache memory and (ii) writing the read missing data to the fourth shared cache memory, wherein the consistency maintaining unit is configured to execute processing for maintaining consistency among the data held in the first shared cache memory, the data held in the second shared cache memory, the data held in the third shared cache memory, and the data held in the fourth shared cache memory, the virtual processor control unit is further: configured to, according to a request for switching of the virtual processors that execute processing in the third processing executing unit,
(i) save on the first context memory a context item of one of the virtual processors executing processing in the third processing executing unit and (ii) set, to the third processing executing unit, a context item held in the first context memory and designated to another one of the virtual processors to execute processing next in the third processing executing unit; and configured to, according to a request for switching of the virtual processors that execute processing in the fourth processing executing unit,
(i) save on the first context memory a context item of one of the virtual processors executing processing in the fourth processing executing unit, and (ii) set, to the fourth processing executing unit, a context item held in the first context memory and designated to another one of the virtual processors to execute processing next in the fourth processing executing unit, and
the partitioned cache control unit is configured to, in the case where a cache miss occurs in the partitioned cache memory, perform control for (i) reading missing data from the main storage unit and (ii) writing the read missing data to one of the storage areas corresponding to one of the virtual processors executing processing in one of the first processing executing unit, the second processing executing unit, the third processing executing unit, and the fourth processing executing unit.

8. The computer system according to claim 6, further comprising:
a third processing executing unit and a fourth processing executing unit each provided in a second processor including hardware threads and is capable of multithreading, and configured to execute threads using hardware and to sequentially execute processing to be executed on the virtual processors, the second processor being different from the first processor;
a third shared cache memory which is provided in the second processor and shared among the virtual processors that execute processing in the third processing executing unit, which holds data to be used by the virtual processors, and which is provided on a storage level higher than the partitioned cache memory;
a third shared cache control unit configured to, in the case where a cache miss occurs in the third shared cache memory, perform control for (i) reading missing data from the partitioned cache memory and (ii) writing the read missing data to the third shared cache memory;
a fourth shared cache memory which is provided in the second processor and shared among the virtual processors that execute processing in the fourth processing executing unit, which holds data to be used by the virtual processors, and which is provided on a storage level higher than the partitioned cache memory;
a fourth shared cache control unit configured to, in the case where a cache miss occurs in the fourth shared cache memory, perform control for (i) reading missing data from the partitioned cache memory and (ii) writing the read missing data to the fourth shared cache memory; and
a second context memory which holds, for each of the virtual processors to execute processing in the third processing executing unit and the fourth processing executing unit, a context item corresponding to the virtual processor,
wherein the first context memory holds the context item corresponding to one of the virtual processors executing processing in the first processing executing unit and the second processing executing unit,
the consistency maintaining unit is configured to execute processing for maintaining consistency among the data held in the first shared cache memory, the data held in the second shared cache memory, the data held in the third shared cache memory, and the data held in the fourth shared cache memory,
the virtual processor control unit is further: configured to, according to a request for switching of the virtual processors that execute processing in the third processing executing unit,
(i) save on the second context memory a context item of one of the virtual processors executing processing in the third processing executing unit, and (ii) set, to the third processing executing unit, a context item held in the second context memory and designated to another one of the virtual processors to execute processing next in the third processing executing unit; and configured to, according to a request for switching of the virtual processors that execute processing in the fourth processing executing unit,
(i) save on the second context memory a context item of one of the virtual processors executing processing in the fourth processing executing unit and (ii) set, to the fourth processing executing unit, a context item held in the second context memory and designated to another one of the virtual processors to execute processing next in the fourth processing executing unit, and
the partitioned cache control unit is configured to, in the case where a cache miss occurs in the partitioned cache memory, perform control for (i) reading missing data from the main storage unit and (ii) writing the read missing data to one of the storage areas corresponding to one of the virtual processors executing processing in one of the first processing executing unit, the second processing executing unit, the third processing executing unit, and the fourth processing executing unit.

9. The computer system according to claim 1,
wherein the partitioned cache memory is partitioned into the storage areas either for each of ways according to a cache scheme of an N-way set associative or for each of cache lines.

10. The computer system according to claim 9,
wherein the context item holds information indicating (i) positions and the number of the ways or (ii) positions and the number of the cache lines, the ways or the cache lines being provided on the partitioned cache memory, and the ways or the cache lines being exclusively used by the virtual processors.

* * * * *